US009875011B2

(12) United States Patent
Uenohara et al.

(10) Patent No.: US 9,875,011 B2
(45) Date of Patent: Jan. 23, 2018

(54) MOVING AN OBJECT BY DRAG OPERATION ON A TOUCH PANEL

(71) Applicant: International Business Machines Corporation, Armonk, NY (US)

(72) Inventors: Hayato Uenohara, Yamato (JP); Satoshi Yokoyama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/689,836

(22) Filed: Apr. 17, 2015

(65) Prior Publication Data
US 2015/0293692 A1 Oct. 15, 2015

Related U.S. Application Data

(62) Division of application No. 13/299,108, filed on Nov. 17, 2011, now Pat. No. 9,041,664.

(30) Foreign Application Priority Data

Nov. 22, 2010 (JP) ................................ 2010-259804

(51) Int. Cl.
G06F 3/041 (2006.01)
G06F 3/0486 (2013.01)
(Continued)

(52) U.S. Cl.
CPC ............ *G06F 3/0486* (2013.01); *G06F 3/041* (2013.01); *G06F 3/044* (2013.01); *G06F 3/0412* (2013.01);
(Continued)

(58) Field of Classification Search
CPC combination set(s) only.
See application file for complete search history.

(56) References Cited

U.S. PATENT DOCUMENTS 8,077,157 B2 12/2011 Sengupta et al.
2006/0109252 A1 5/2006 Kolmykov-Zotov et al.
(Continued)

FOREIGN PATENT DOCUMENTS

CN 1462416 A 12/2003
CN 101308441 A 11/2008
(Continued)

OTHER PUBLICATIONS

Yuichi Okano, et al., 3-Dimensional Touch Panel System which can detect the proximity and contact of the finger, Human Computer Interaction Workshop Technical Report, Jan. 26, 2009, pp. 9-14, Information Processing Society of Japan, National Institute of Informatics, Published on the World Wide Web at: http://ci.nii.ac.jp/naid/110007123908/en.

(Continued)

*Primary Examiner* — Robin Mishler
(74) *Attorney, Agent, or Firm* — Lee Law, PLLC; Christopher B. Lee

(57) ABSTRACT

A contact state of a finger with respect to an object displayed on a first layer is detected. The object is moved onto a second layer and displayed on the second layer in response to detecting that the finger has moved from the contact state to a proximity state with respect to the object and in response to the finger reaching a second layer displayed nearer than the first layer.

12 Claims, 24 Drawing Sheets

(51) Int. Cl.
  *G06F 3/0488* (2013.01)
  *H04N 13/04* (2006.01)
  *G06F 3/044* (2006.01)
  *G06F 3/0481* (2013.01)
  *G06F 3/0484* (2013.01)

(52) U.S. Cl.
  CPC ........ *G06F 3/0488* (2013.01); *G06F 3/04815* (2013.01); *G06F 3/04845* (2013.01); *G06F 3/04883* (2013.01); *H04N 13/0452* (2013.01); *G06F 2203/04101* (2013.01); *G06F 2203/04108* (2013.01); *G06F 2203/04112* (2013.01); *G06F 2203/04808* (2013.01)

(56) References Cited

U.S. PATENT DOCUMENTS

| | | | |
|---|---|---|---|
| 2008/0225007 A1* | 9/2008 | Nakadaira | G06F 3/04815 345/173 |
| 2008/0259048 A1 | 10/2008 | Touyamasaki | |
| 2009/0201266 A1* | 8/2009 | Hashimoto | A61B 8/00 345/173 |
| 2010/0095206 A1* | 4/2010 | Kim | G06F 3/017 715/702 |
| 2011/0032198 A1 | 2/2011 | Miyazawa et al. | |
| 2011/0037714 A1 | 2/2011 | Seo et al. | |
| 2011/0093778 A1 | 4/2011 | Kim et al. | |
| 2012/0056850 A1 | 3/2012 | Kasahara et al. | |
| 2012/0062549 A1* | 3/2012 | Woo | G06F 3/04815 345/419 |
| 2012/0127102 A1 | 5/2012 | Uenohara et al. | |
| 2015/0293657 A1 | 10/2015 | Uenohara et al. | |
| 2015/0293658 A1 | 10/2015 | Uenohara et al. | |

FOREIGN PATENT DOCUMENTS

| | | |
|---|---|---|
| CN | 101495951 A | 7/2009 |
| CN | 101673179 A | 3/2010 |
| JP | 13-277688 A | 3/2003 |
| JP | 21-105705 A | 11/2010 |
| JP | 22-199638 A | 3/2012 |
| WO | 2006041097 A1 | 4/2006 |
| WO | 2010064387 A1 | 6/2010 |
| WO | 2010098050 A1 | 9/2010 |

OTHER PUBLICATIONS

Author Unknown, State Intellectual Property Office of the People's Republic of China (SIPO), Office Action for Chinese Application No. 201110343135.4 (English translation not available), Jan. 6, 2014, pp. 1-10, P. R. China.

Author Unknown, State Intellectual Property Office of the People's Republic of China (SIPO), Office Action for Chinese Application No. 201110343135.4 (English translation not available), Jul. 16, 2014, pp. 1-9, P. R. China.

United States Patent and Trademark Office, Office Action for U.S. Appl. No. 13/299,108, Aug. 7, 2014, pp. 1-6, Alexandria, VA, USA.

United States Patent and Trademark Office, Office Action for U.S. Appl. No. 13/299,108, Sep. 5, 2014, pp. 1-16, Alexandria, VA, USA.

United States Patent and Trademark Office, Notice of Allowance for U.S. Appl. No. 13/299,108, Jan. 20, 2015, pp. 1-5, Alexandria, VA, USA.

United States Patent and Trademark Office, Notice of Allowance for U.S. Appl. No. 14/690,018, Dec. 21, 2015, pp. 1-15, Alexandria, VA, USA.

United States Patent and Trademark Office, Office Action for U.S. Appl. No. 14/689,942, Nov. 4, 2016, pp. 1-19, Alexandria, VA, USA.

United States Patent and Trademark Office, Office Action for U.S. Appl. No. 14/689,942, Feb. 17, 2017, pp. 1-12, Alexandria, VA, USA.

United States Patent and Trademark Office, Office Action for U.S. Appl. No. 14/689,942, dated Jun. 14, 2017, pp. 1-16, Alexandria, VA, USA.

United States Patent and Trademark Office, Notice of Allowance for U.S. Appl. No. 14/689,942, dated Oct. 12, 2017, pp. 1-16, Alexandria, VA, USA.

* cited by examiner

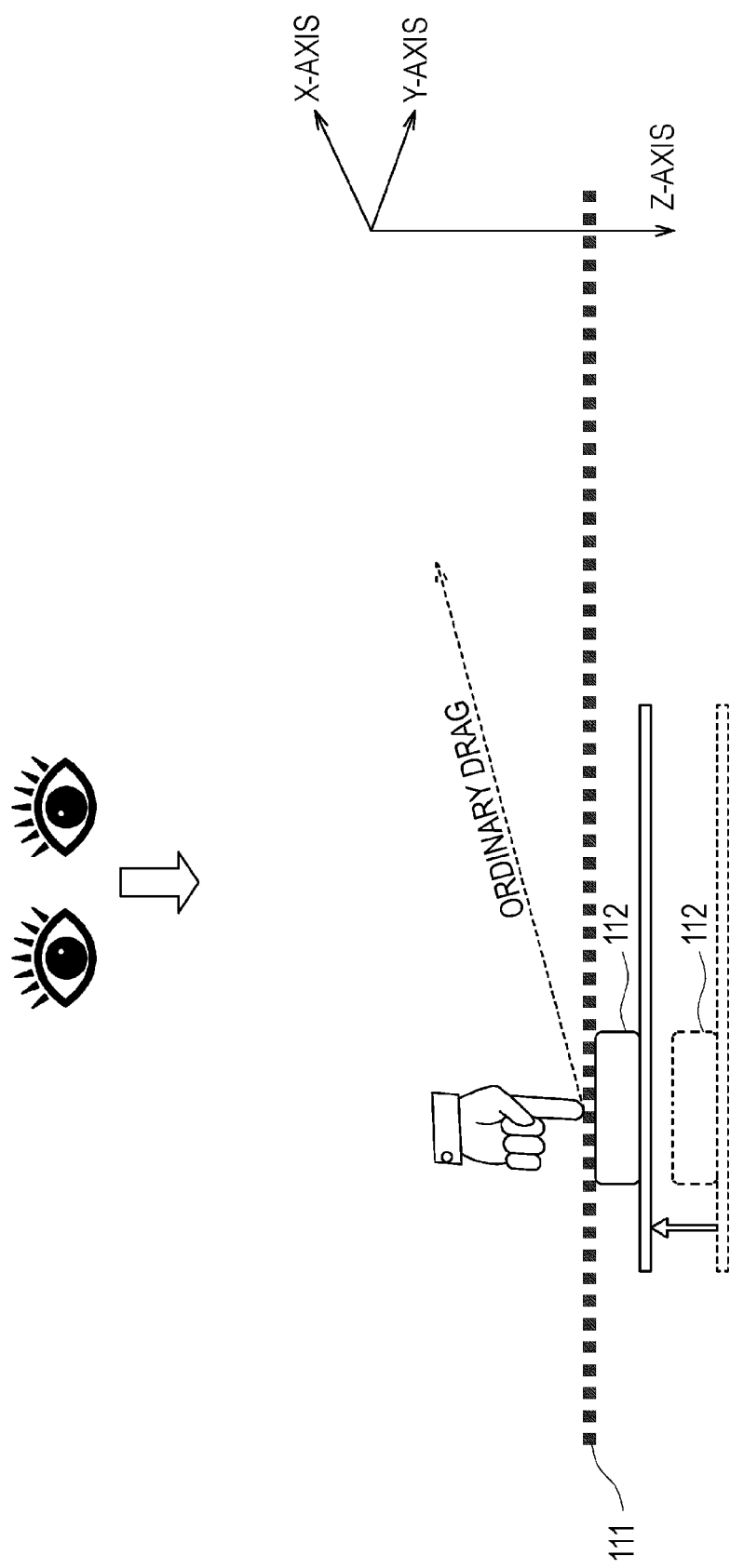

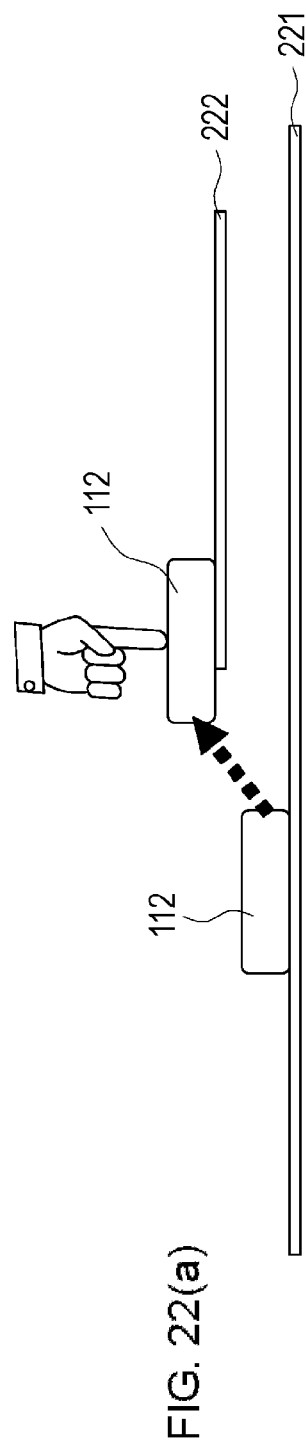
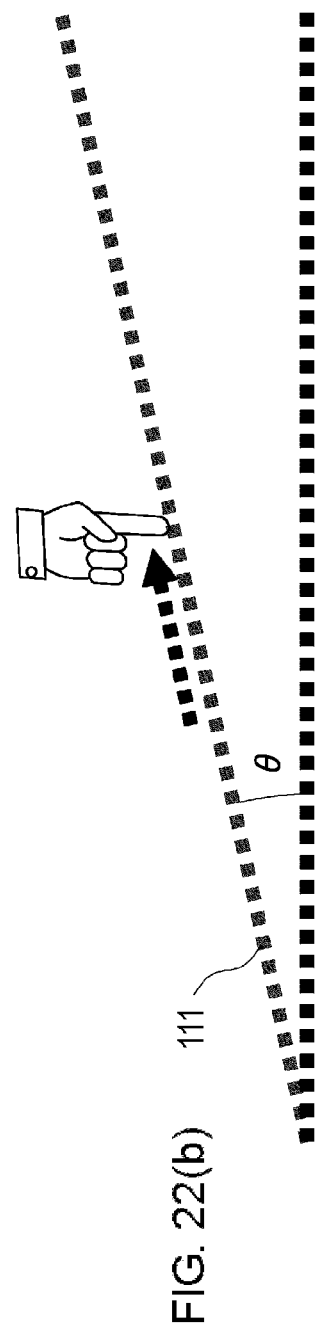

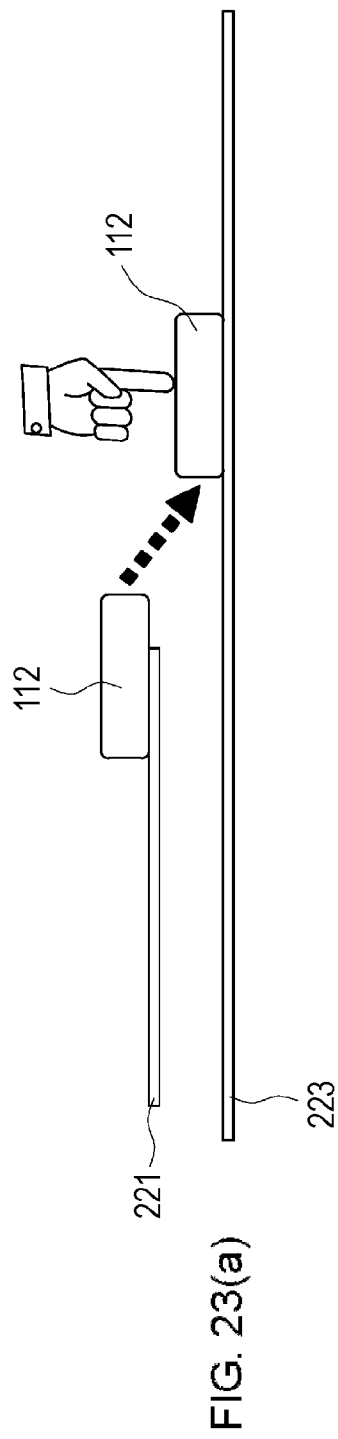
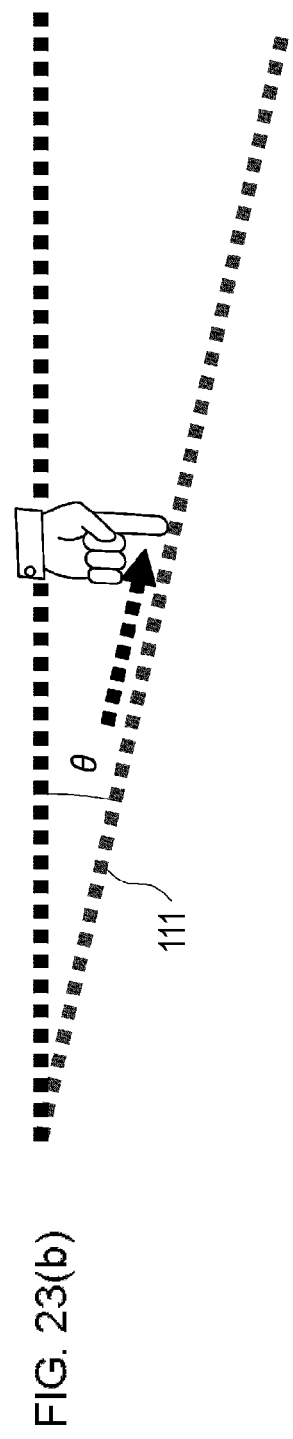

MOVING AN OBJECT BY DRAG OPERATION ON A TOUCH PANEL

BACKGROUND

The present invention relates to moving an object by a drag operation on a touch panel where contact and proximity of a finger or the positions of the finger at contact and proximity may be detected.

Information processing apparatuses equipped with a touch panel have recently been developed. A touch panel allows the user to intuitively operate information by direct contact with the display.

BRIEF SUMMARY

In accord with certain implementations, a method for moving a displayed object among a plurality of display layers by an information processing apparatus connected to a three-dimensional (3-D) touch panel capable of data communication therewith, involves detecting a contact state of a finger with respect to an object displayed on a first layer; in response to detecting that the finger has moved from the contact state to a proximity state with respect to the object and in response to the finger reaching a second layer displayed nearer than the first layer, moving the object onto the second layer; and displaying the object on the second layer.

In certain implementations, the method further involves, in response to detecting that the finger has moved from the proximity state to the contact state with respect to the object again, displaying the object on a layer with which the finger is in contact at a point on a display surface of a display screen where it is detected that the finger has moved to the contact state again.

In certain implementations, the method further involves measuring a time from when the finger moved to the proximity state with respect to the object; determining whether a predetermined time has elapsed after a start of the time measurement; in response to determining that the predetermined time has elapsed, returning the object to a position at which the object is displayed at the point on the display surface of the display screen where it is detected that the finger has moved to the proximity state; and displaying the object.

In another implementation, a method for moving an object displayed with a feeling of depth on a three-dimensional (3-D) display by an information processing apparatus connected to a 3-D touch panel capable of data communication therewith, involves detecting a contact state of a finger with respect to a first displayed object; in response to detecting a double-click operation on the first displayed object at a first position in a depthwise direction is detected, moving the first displayed object onto a surface of a display screen of the 3-D display and displaying the first object; and in response to detecting that the finger has moved from the contact state to a proximity state with respect to the first displayed object, changing a display position of the first displayed object to a position at which an object nearest in the depthwise direction among displayed objects is displayed.

In certain implementations, the method further involves, in response to detecting that the finger has moved from the proximity state to the contact state with respect to the first displayed object again, changing the display position of the first displayed object to a position on the surface of the display screen of the 3-D display and displaying the first object.

In certain implementations, the method further involves, in response to detecting that the finger has moved again from the proximity state to the contact state with respect to the first displayed object, changing a position at which a second object is displayed by a same amount of movement as that of the display position of the first displayed object, and displaying the second object.

In another implementation, a method for moving a displayed object among a plurality of display layers by an information processing apparatus connected to a two-dimensional (2-D) touch panel and an inclination angle sensor that detects an angle of inclination of the 2-D touch panel capable of data communication therewith, involves detecting a contact state of a finger with respect to an object displayed on a first layer; obtaining the angle of inclination detected by the inclination angle sensor, where the angle of inclination along a display surface at a point where it is detected that the finger has moved to the contact state with respect to the object is configured as zero degrees; in response to determining that the obtained angle of inclination changes from zero degrees to a positive value and in response to a dragging of the finger in a higher direction along the angle of inclination, moving the object onto a second layer displayed nearer than the first layer at the point where the object reaches the second layer and displaying the object; and in response to determining that the obtained angle of inclination changes from zero degrees to a negative value and in response to the dragging of the finger to a lower direction along the angle of inclination, moving the object onto a third layer displayed deeper than the first layer at the point where the object reaches the third layer and displaying the object.

In certain implementations, the method further involves, in response to determining that the obtained angle of inclination has returned to zero degrees again, displaying the object on a layer with which the finger is in contact at the point where the angle of inclination has returned to zero degrees again.

In another implementation, a method for moving an object displayed with a feeling of depth on a three-dimensional (3-D) display by an information processing apparatus connected to a two-dimensional (2-D) touch panel and an inclination angle sensor for detecting an angle of inclination of the 2-D touch panel capable of data communication therewith, involves detecting a contact state of a finger with respect to a displayed object; in response to detecting a double-click operation on the displayed object at a first position in a depthwise direction, moving the displayed object onto a surface of a display screen of the 3-D display and displaying the object; obtaining the angle of inclination detected by the inclination angle sensor, where the angle of inclination along the display surface at a point where the finger has moved to the contact state with respect to the displayed object is configured as zero degrees; displaying the object inclined at an angle opposite in positive and negative from the obtained angle of inclination on the 3-D display; and moving the object along the angle of inclination at the angle opposite in positive and negative from the obtained angle of inclination on the 3-D display in response to detecting a dragging of the finger, and displaying the object.

An apparatus, consistent with certain implementations, is connected to a three-dimensional (3-D) touch panel capable of data communication therewith for moving a displayed object among a plurality of display layers, and the apparatus has a contact-state detection section configured to detect a contact state of a finger with respect to an object displayed on a first layer; and an object display section configured to, in response to a detection that the finger has moved from the contact state to a proximity state with respect to the object, and in response to the finger reaching a second layer displayed nearer than the first layer, move the object onto the second layer and display the object on the second layer.

In certain implementations, the object display section is further configured to, in response to a detection that the finger has moved from the proximity state to the contact state with respect to the object again, display the object on a layer with which the finger is in contact at a point on a display surface of a display screen where it is detected that the finger has moved to the contact state again.

In certain implementations, the apparatus further has a timer section configured to measure a time from when the finger has moved to the proximity state with respect to the object; a determination section configured to determine whether a predetermined time has elapsed after a start of the time measurement; and where the object display section is configured to, in response to the determination section determining that the predetermined time has elapsed, return the object to a position at which the object is displayed at the point on the display surface of the display screen where it is detected that the finger has moved to the proximity state and display the object.

An apparatus, consistent with another implementation, is connected to a three-dimensional (3-D) touch panel capable of data communication therewith for moving an object displayed with a feeling of depth on a 3-D display, and the apparatus has a contact-state detection section configured to detect a contact state of a finger with respect to a first displayed object; an object display section configured to, in response to detection of a double-click operation on the first displayed object at a first position in a depthwise direction, move the first displayed object onto a surface of a display screen of the 3-D display and display the first displayed object; and in response to a detection that the finger has moved from the contact state to a proximity state with respect to the first displayed object, change a display position of the first displayed object to a position at which an object nearest in the depthwise direction among displayed objects is displayed.

In certain implementations, the object display section is further configured to, in response to a determination that the object has moved from the proximity state to the contact state again, change the display position of the first displayed object to a position on the surface of the display screen of the 3-D display and display the object.

In certain implementations, the object display section is further configured to, in response to a detection that the finger has moved again from the proximity state to the contact state with respect to the first displayed object, change a position at which a second object is displayed by a same amount of movement as that of the display position of the first displayed object and display the second object.

An apparatus, consistent with another implementation, is connected to a two-dimensional (2-D) touch panel and an inclination angle sensor that detects an angle of inclination of the 2-D touch panel capable of data communication therewith for moving a displayed object among a plurality of display layers, and the apparatus has a contact-state detection section configured to detect a contact state of a finger with respect to an object displayed on a first layer; an inclination-angle acquisition section configured to obtain the angle of inclination detected by the inclination angle sensor, where the angle of inclination along a display surface at a point where it is detected that the finger has moved to the contact state with respect to the object is configured as zero degrees; and an object display section configured to, in response to a determination that the obtained angle of inclination changes from zero degrees to a positive value and in response to a dragging of the finger in a higher direction along the angle of inclination, move the object onto a second layer displayed nearer than the first layer at a point where the object reaches the second layer and display the object; in response to a determination that the obtained angle of inclination changes from zero degrees to a negative value and in response to a dragging of the finger in a lower direction along the angle of inclination, move the object onto a third layer displayed deeper than the first layer at a point where the object reaches the third layer and display the object.

In certain implementations, the object display section is further configured to, in response to a determination that the obtained angle of inclination has returned to zero degrees again, display the object on a layer with which the finger is in contact at the point where the angle of inclination has returned to zero degrees again.

An apparatus, consistent with another implementation, is connected to a two-dimensional (2-D) touch panel and an inclination angle sensor that detects an angle of inclination of the 2-D touch panel capable of data communication therewith for moving an object displayed with a feeling of depth on a three-dimensional (3-D) display, and the apparatus has a contact-state detection section configured to detect a contact state of a finger with respect to a displayed object; an object display section configured to, in response to detection of a double-click operation on the displayed object at a first position in a depthwise direction, move the displayed object onto a surface of a display screen of the 3-D display and display the object; an inclination-angle acquisition section configured to obtain the angle of inclination detected by the inclination angle sensor, where the angle of inclination along the display surface at a point where the finger has moved to the contact state with respect to the displayed object is configured as zero degrees; and wherein the object display section is configured to display the object inclined at an angle opposite in positive and negative from the obtained angle of inclination on the 3-D display and move the object along the angle of inclination at the angle opposite in positive and negative from the obtained angle of inclination on the 3-D display in response to detecting a dragging of the finger, and to display the object.

In another implementation, a computer program product includes a computer readable storage medium including computer readable program code, where the computer readable program code when executed on a computer causes the computer to detect a contact state of a finger with respect to an object displayed on a first layer; and, in response to detecting that the finger has moved from the contact state to a proximity state with respect to the object and in response to the finger reaching a second layer displayed nearer than the first layer, move the object onto the second layer and display the object on the second layer.

According to the present invention, a desired object may be displayed at a desired relative position without interrupting a series of operations. Furthermore, the visual gap between the position of a finger that operates an object and the position of the displayed object may be easily corrected on a 3-D touch panel that displays a depth, thus allowing the operation without a feeling of difference.

BRIEF DESCRIPTION OF THE SEVERAL VIEWS OF THE DRAWINGS

FIG. 21 is a schematic diagram showing an operation example of the 2-D touch panel according to the fourth example implementation of the present subject matter.

FIG. 22(a) and FIG. 22(b) are schematic diagrams showing an example of object movement on the 2-D touch panel according to the fourth example implementation of the present subject matter.

FIG. 23(a) and FIG. 23(b) are schematic diagrams showing an example of object movement on the 2-D touch panel according to the fourth example implementation of the present subject matter.

DETAILED DESCRIPTION

Figure 1:
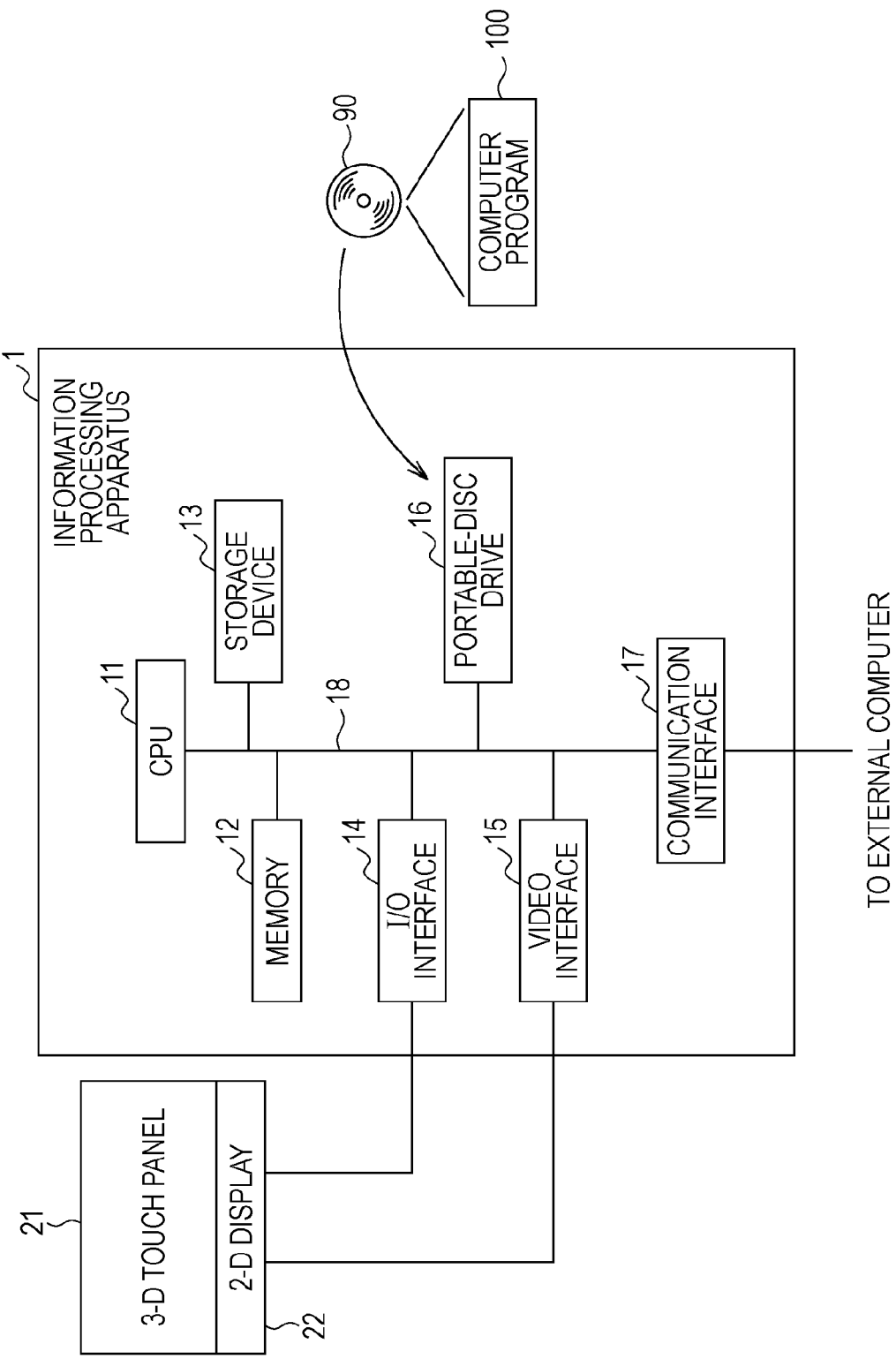
FIG. 1 is a block diagram showing a configuration of an information processing apparatus according to a first example of an implementation of the present subject matter.

An apparatus connected to a three-dimensional (3-D) touch panel capable of data communication therewith for moving a displayed object among a plurality of layers or for moving an object displayed with a feeling of depth according to embodiments of the present invention will be specifically described hereinbelow with reference to the drawings. It should be noted that the example embodiments below do not limit the present subject matter described in the claims and all the combinations of features described in the embodiments are possible solutions. The word "Figure" is used below instead of the abbreviation "FIG." for the drawings.

It is also to be understood that the present invention may be embodied in many different forms and should not be limited to the descriptions of the example embodiments. The same components are given the same reference designators throughout the examples.

Although the following examples are described when applied to an apparatus in which a computer system implements a computer program, it should be noted that part of the present subject matter may be embodied as a computer program that may be executed by a computer. Accordingly, the present subject matter may be embodied as hardware, which is an apparatus connected to a 3-D touch panel, so as to be capable of data communication therewith for moving a displayed object among a plurality of layers or an apparatus for moving an object displayed with a feeling of depth, software, or a combination of hardware and software. The computer program may be stored in any computer-readable recording media, such as a hard disk, a DVD, a CD, an optical storage unit, and a magnetic storage unit.

According to the present subject matter, a desired object may be displayed at a desired relative position without interrupting a series of operations. Furthermore, a visual gap between a position of a finger that operates an object and a position of the displayed object may be corrected on a 3-D touch panel that displays a depth, thus allowing operation without a feeling of difference.

It should be noted that conception of the present subject matter resulted from recognition of certain limitations associated with conventional touch panel-based devices. For example, it was recognized that with conventional touch panel-based devices, a contact button cannot be focused or previewed, along with the display size of the button. It was further recognized that a display input device for an input operation detects a proximity state before a finger comes into contact with a touch panel and that by detecting the proximity state of the finger, the focus may be changed depending on the proximity position to display the button in an enlarged scale. It was additionally observed that a three-dimensional (3-D) touch panel capable of detecting a proximity state before a finger comes into contact therewith detects the position of the finger by detecting an electrostatic capacitance generated between the touch panel and the finger, thus allowing a light-touch input operation. However, it was recognized that the system cannot move an object onto an intended layer for an application with a layer structure. Furthermore, it was recognized that even for the same object, the operation method differs between a movement by dragging and a movement between layers, and thus the object cannot be moved by a series of operations with conventional touch panel-based devices. It was further recognized that user of certain applications, such as PowerPoint® developed by Microsoft® and Photoshop® developed by Adobe®, need to select a menu with a right-click operation and then select "Order" item in moving an object to a different layer, which has problems in that the operation is complicated and the object cannot be moved onto a desired layer. Furthermore, it was recognized that with a 3-D touch panel combined with a three-dimensional display (3-D display), a visual gap occurs between the position of a finger that operates an object and the position of the object displayed, which causes a feeling of difference in operation. The present subject matter improves touch panel-based devices by allowing an object to be moved onto a different layer by a series of drag operations by differentiating a drag operation between a contact state and a proximity state or by combining a double-click operation, the inclination of a touch panel, and other improvements with the drag operation.

FIG. 1 is a block diagram showing a configuration of an information processing apparatus according to a first example of an implementation of the present subject matter. An information processing apparatus 1 includes at least a central processing unit (CPU) 11, a memory 12, a storage device 13, an input/output (I/O) interface 14, a video interface 15, a portable-disc drive 16, a communication interface 17, and an internal bus 18 that connects the foregoing hardware.

The CPU 11 is connected to the foregoing hardware components of the information processing apparatus 1 via the internal bus 18. The CPU 11 controls the operations of the foregoing hardware components and implements various software functions in accordance with a computer program 100 stored in the storage device 13. The memory 12 is a volatile memory, such as a static random access memory (SRAM) or a synchronous dynamic RAM (SDRAM), in which a load module is expanded when the computer program 100 is executed to store temporary data etc. generated when the computer program 100 is executed.

The storage device 13 is a built-in fixed storage device (hard disk), a read-only memory (ROM), or the like. The computer program 100 stored in the storage device 13 is downloaded using the portable-disc drive 16 from a portable recording medium 90, such as a digital versatile disc (DVD) or a compact disc read-only memory (CD-ROM), in which information, such as programs and data, is stored, and at runtime, it is expanded from the storage device 13 to the memory 12. Of course, computer programs downloaded from an external computer (not shown) connected via the communication interface 17 may be used.

The communication interface 17 is connected to the internal bus 18 and is capable of data transmission and reception to/from the external computer etc. when connected to an external network, such as the Internet, a local area network (LAN), or a wide area network (WAN).

The I/O interface 14 is connected to a 3-D touch panel 21 and accepts data entry. The video interface 15 is connected to a 2-D display 22 integrated with the 3-D touch panel 21 and displays a given image. The user operates an object displayed on the 2-D display 22 with a finger.

Figure 2:
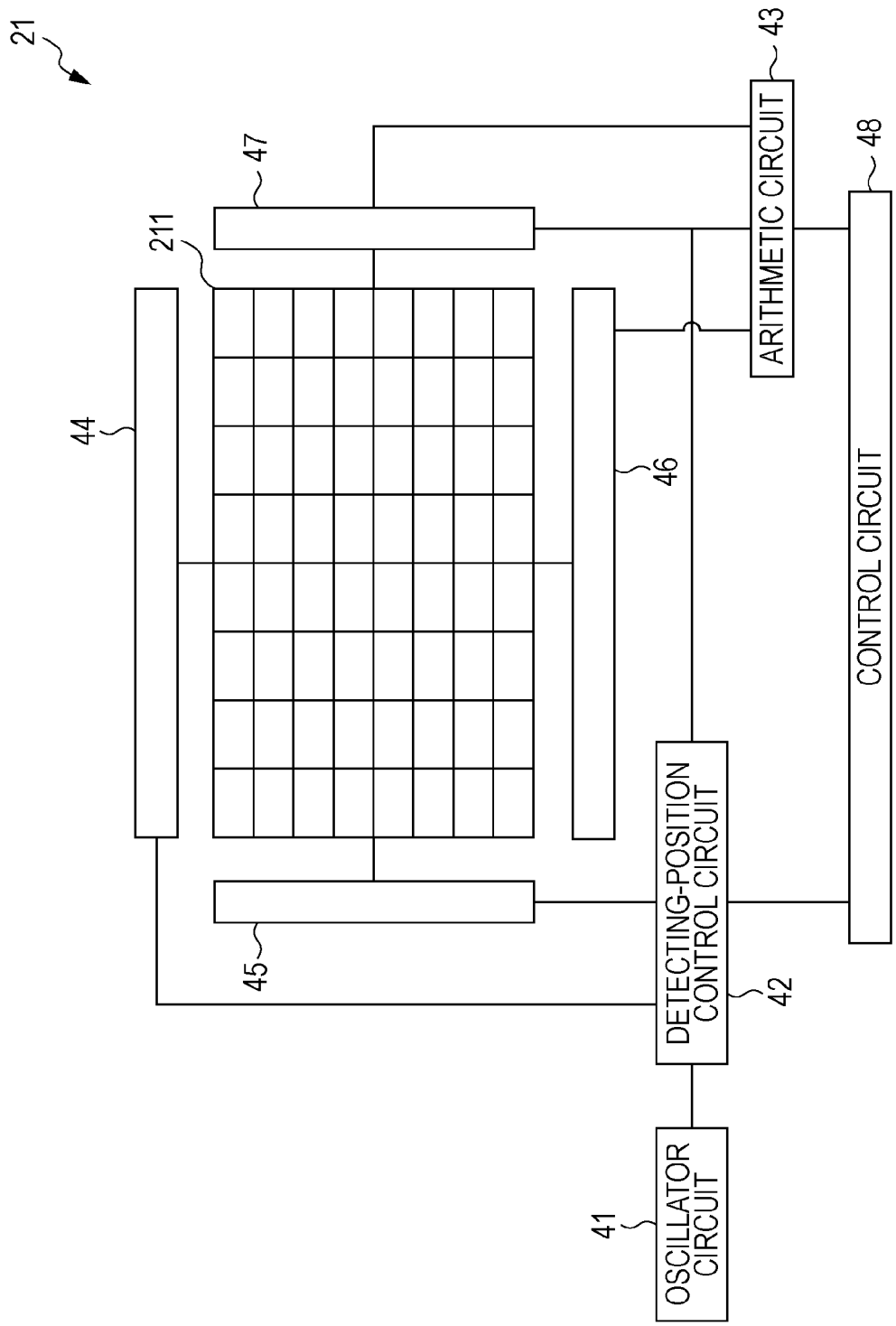
FIG. 2 is a block diagram showing a configuration of a 3-D touch panel according to the first example implementation of the present subject matter.

FIG. 2 is a block diagram showing a configuration of the 3-D touch panel 21 according to the first example implementation of the present subject matter. As shown in FIG. 2, the 3-D touch panel 21 includes at least a touch panel section (2-D display) 211, an oscillator circuit 41, a detecting-position control circuit 42, an arithmetic circuit 43, an X-axis input side switch 44, a Y-axis input side switch 45, an X-axis output side switch 46, a Y-axis output side switch 47, and a control circuit 48.

The touch panel section 211 is a touch panel in which X-axis electrode wires for detecting a position in the X-axis direction and Y-axis electrode wires for detecting a position in the Y-axis direction are arrayed in a matrix. The oscillator circuit 41 is an oscillator circuit that generates a pulse signal. The detecting-position control circuit 42 is a control circuit for controlling which of the X-axis electrode wires and the Y-axis electrode wires of the touch panel section 211 are to be connected.

The arithmetic circuit 43 is a circuit that detects a signal from the touch panel section 211 and calculates a contact position or a proximity position of a finger. The X-axis input side switch 44 is a switch for inputting a pulse signal to the input port of the X-axis electrode wires, and the Y-axis input side switch 45 is a switch for inputting a pulse signal to the input port of the Y-axis electrode wires. The X-axis output side switch 46 is a switch for connecting the output port of the X-axis electrode wires to the arithmetic circuit 43, and the Y-axis output side switch 47 is a switch for connecting the output port of the Y-axis electrode wires to the arithmetic circuit 43.

The control circuit 48 controls the overall operation of the 3-D touch panel 21 and instructs the detecting-position control circuit 42 to detect a finger contact position or proximity position, with a predetermined number of electrodes connected. When the position is detected, the control circuit 48 issues an instruction to individually connect electrodes in the vicinity of the detected position and to connect the other electrodes by a predetermined number.

The operation of the apparatus connected to the 3-D touch panel 21 with the above configuration capable of data communication for moving a displayed object among a plurality of layers will be described hereinbelow.

Figure 3:
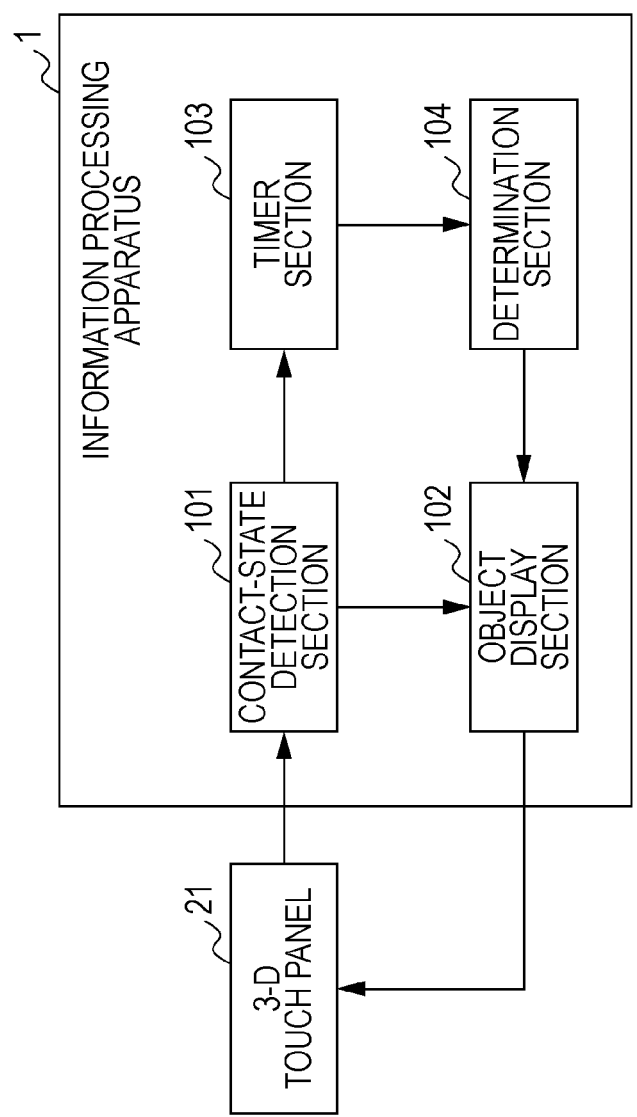
FIG. 3 is a functional block diagram of the information processing apparatus according to the first example implementation of the present subject matter.

FIG. 3 is a functional block diagram of the information processing apparatus 1 according to the first example implementation of the present subject matter. In FIG. 3, a contact-state detection section 101 of the information processing apparatus 1 receives an output signal from the 3-D touch panel 21 and extracts positional information of a displayed object, layer information, and information on the contact state of the finger in response to the output signal. The information on the contact state of the finger is information of whether, for example, the finger is in a contact state, a proximity state, or a separate state, which may be determined from output signals from individual sensors of the 3-D touch panel 21.

An object display section 102 changes a method for displaying the object, depending on the information on the contact state of the finger. For example, in the case where it is detected that the finger has moved from a contact state to a proximity state with respect to an object displayed on a first layer, the object display section 102 moves the object onto the second layer and displays it when the finger has reached a position on a second layer displayed nearer than the first layer.

In the case where it is detected that the finger has moved from the proximity state to the contact state with respect to the object again, the object display section 102 displays the object at the point where it is detected that the finger has moved to the contact state.

A timer section 103 measures the time from the point where the finger has moved to the proximity state with respect to the object. A determination section 104 determines whether a predetermined time has passed after the timing is started in the timer section 103. When it is determined by the determination section 104 that a predetermined time has passed after the start of timing, the object display section 102 returns the object to the position at which it is displayed at the point where the finger moved to the proximity state and displays it. Here, the predetermined time is 100 milliseconds (ms), for example, though other times are possible.

In the first example, although completion of a drag operation is determined on the basis of whether a predetermined time has passed after moving to the proximity state, the present subject matter is not particularly limited thereto. For example, the determination of completion of the drag operation may be made on the basis of whether the distance from the screen to the finger is longer than a predetermined distance. In this case, for example, since the resolution in the direction perpendicular to the screen in a proximity state often has two hundred and fifty six (256) levels of gray, the determination of whether the distance from the screen to the finger is longer than a predetermined distance, that is, whether the drag operation has been completed, may be made on the basis of whether the resolution is higher than a predetermined levels of gray.

Figure 4:
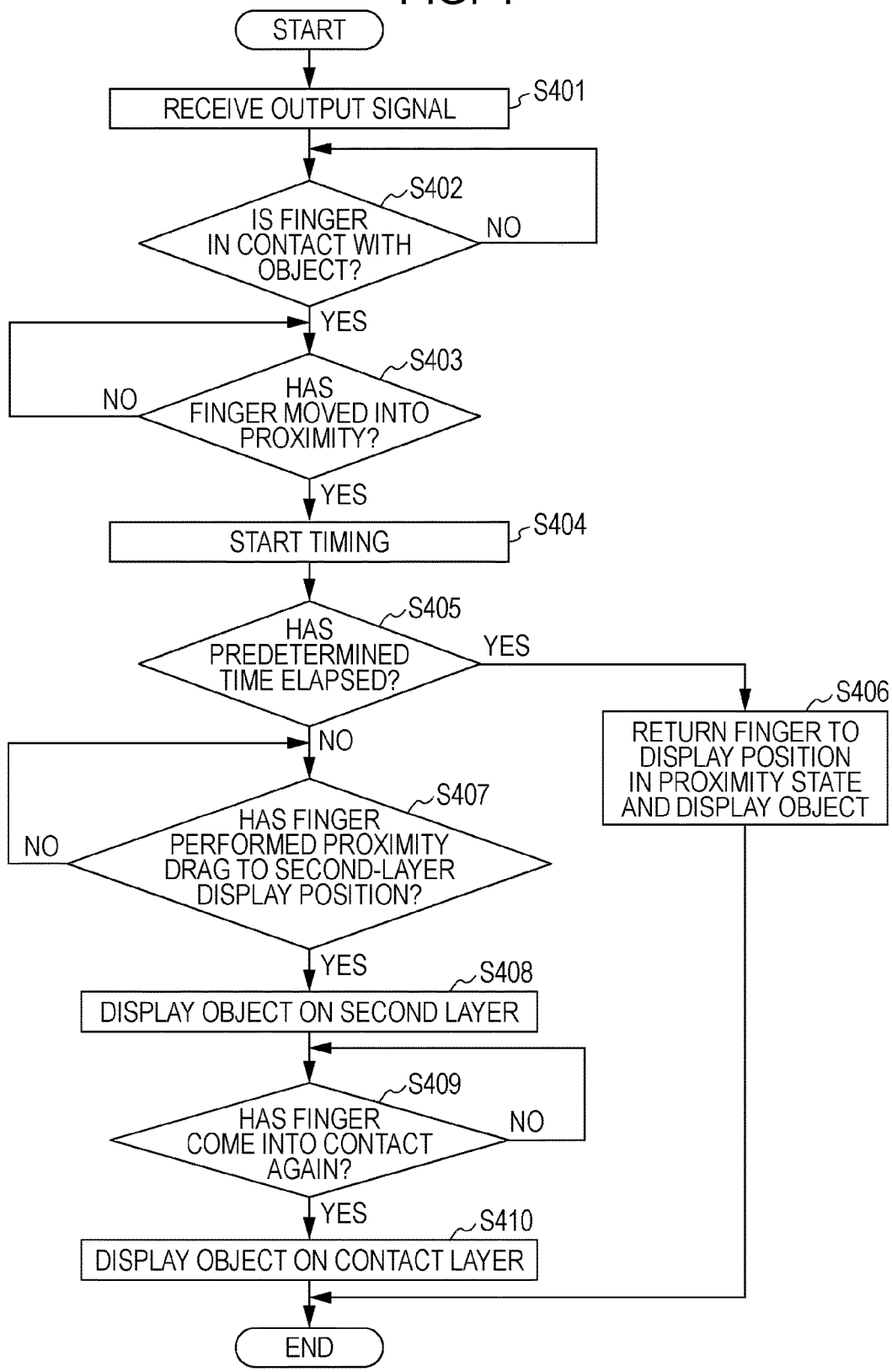
FIG. 4 is a flowchart showing the procedure of the CPU of the information processing apparatus according to the first example implementation of the present subject matter.

FIG. 4 is a flowchart showing the procedure of the CPU 11 of the information processing apparatus 1 according to the first example implementation of the present subject matter. In FIG. 4, the 3-D touch panel 21 is provided with the 2-D display 22, and an object is moved between at least two layers, that is, a front layer displayed at the front side and a back layer.

Figure 5:
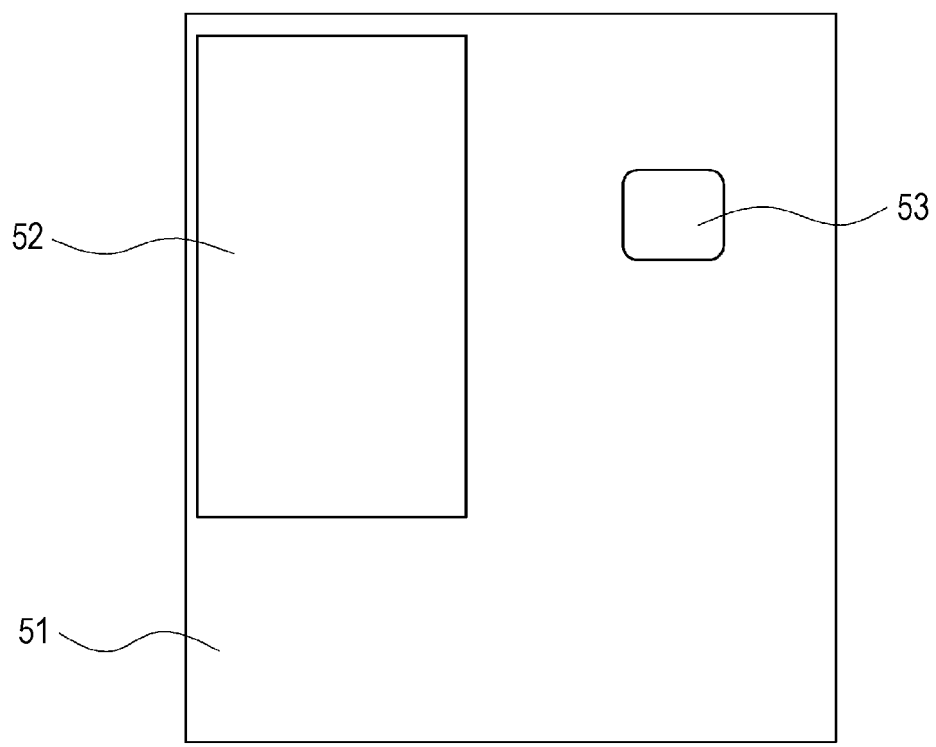
FIG. 5 is a schematic diagram showing the display state of the 3-D touch panel according to the first example implementation of the present subject matter.

FIG. 5 is a schematic diagram showing the display state of the 3-D touch panel 21 according to the first example implementation of the present subject matter. As shown in FIG. 5, an object 53 is displayed on a back layer (first layer) 51, and the object 53 is moved onto a front layer (second layer) 52 by dragging the object 53 with a finger (hereinafter referred to as "ordinary drag").

Figure 6:
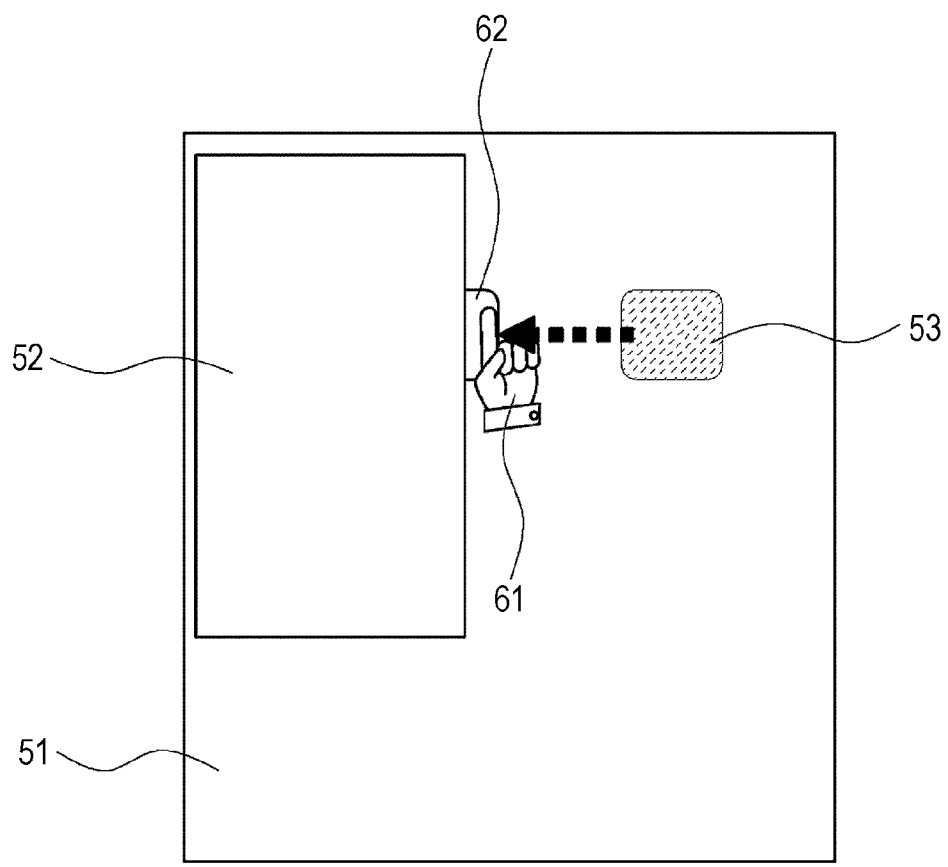
FIG. 6 is a schematic diagram showing the moving state of an object on a conventional 3-D touch panel.

FIG. 6 is a schematic diagram showing the moving state of the object 53 on a conventional 3-D touch panel. As shown in FIG. 6, the object 53 displayed on the back layer 51 is moved onto the front layer 52 by an ordinary drag with a finger 61. It should be noted that with the conventional 3-D touch panel, the object 53 cannot be moved onto the front layer 52, so that the portion where a moved object 62 and the front layer 52 overlap displays the front layer 52 but does not display the moved object 62. The present subject matter allows the object 53 to be moved onto the front layer (second layer) 52.

Thus, the first example implementation allows a drag operation in a proximity state (hereinafter referred to as "proximity drag") by detecting the proximity state of the finger. In other words, in the case where the object 53 is moved onto the front layer (second layer) 52 during a proximity drag, the moved object 62 is displayed on the front layer 52.

Referring back to FIG. 4, the CPU 11 of the information processing apparatus 1 receives an output signal from the 3-D touch panel 21 (step S401) and determines whether the finger is in a contact state in which the finger is in contact with an object displayed on the first layer on the basis of the received output signal (step S402). If the CPU 11 determines that the finger is not in the contact state (step S402: NO), the CPU 11 goes into a waiting state until the finger comes into the contact state.

If the CPU 11 determines that the finger is in the contact state (step S402: YES), the CPU 11 determines that an ordinary drag is started and determines whether the finger has moved to a proximity state (step S403). If the CPU 11 determines that the finger has not moved to the proximity state (step S403: NO), the CPU 11 goes into a waiting state until the finger comes into the proximity state.

If the CPU 11 determines that the finger has moved to the proximity state (step S403: YES), the CPU 11 determines that the finger has started a proximity drag, starts timing with a built-in timer or the like (step S404), and determines whether a predetermined time has passed (step S405). If the CPU 11 of the information processing apparatus 1 determines that a predetermined time has passed (step S405: YES), the CPU 11 returns the finger to the position where the object is displayed at the point where the finger has moved to the proximity state and displays the object (step S406). If the CPU 11 determines that a predetermined time has not passed (step S405: NO), the CPU 11 determines whether the finger has performed the proximity drag to a position where the second layer is displayed (step S407). If the CPU 11 determines that the finger has not performed the proximity drag to the position where the second layer is displayed (step S407: NO), the CPU 11 goes to a waiting state.

If the CPU 11 determines that the finger has performed the proximity drag to the position where the second layer is displayed (step S407: YES), the CPU 11 displays the object on the second layer (step S408) and determines whether the finger has moved to the contact state again (step S409). If the CPU 11 determines that the finger has not moved again (step S409: NO), the CPU 11 goes to a moving waiting state again.

If the CPU 11 determines that the finger has moved again (step S409: YES), the CPU 11 determines that the finger has returned to the ordinary drag and displays the object on a layer with which the finger is in contact when it is detected that the finger has moved to the contact state (step S410).

Figure 7:
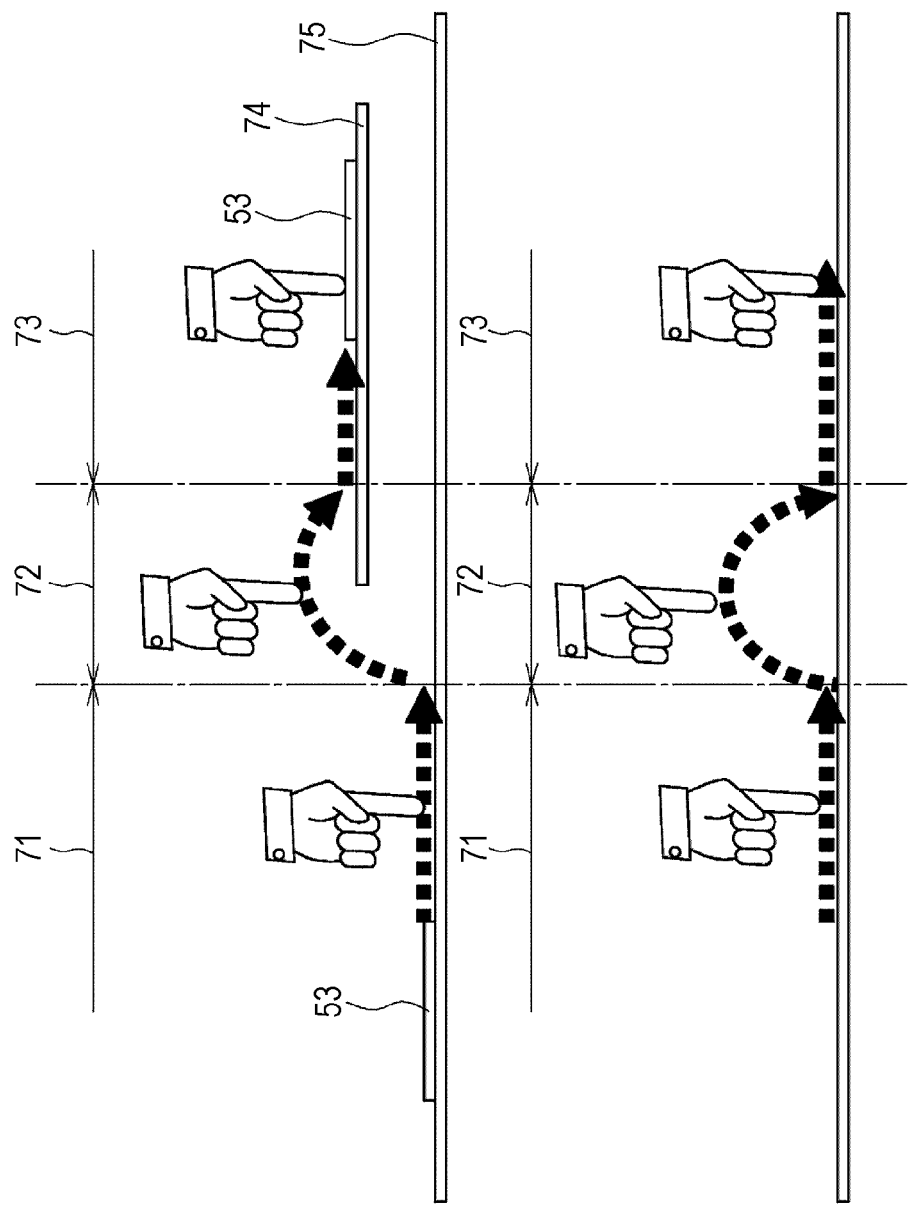
FIG. 7(a) and FIG. 7(b) are schematic diagrams showing a drag operation on the 3-D touch panel according to the first example implementation of the present subject matter.

FIG. 7(a) and FIG. 7(b) are schematic diagrams showing a drag operation on the 3-D touch panel 21 according to the first example implementation of the present subject matter. FIG. 7(a) is an image diagram of object movement through a drag operation on the 3-D touch panel 21, and FIG. 7(b) is an image diagram of an actual drag operation on the 3-D touch panel 21.

As shown in FIG. 7(a), an ordinary drag is first performed in a section 71 to move the object 53 on a lower layer (first layer) 75. Subsequently, a proximity drag is performed in a section 72. When the finger comes near (has reached) the upper layer (second layer) 74 during a proximity drag, the object 53 is moved onto the upper layer (second layer) 74. If the finger returns to the ordinary drag in a section 73, the object 53 is moved on the upper layer (second layer) 74.

In the case where the object 53 first moves on the upper layer 74 and comes near (has reached) the lower layer 75 during a proximity drag, the object 53 is moved onto the lower layer 75, contrary to FIG. 7(a). When the finger returns to the ordinary drag, the object 53 is moved onto the lower layer 75.

The actual movement of the user's finger is shown in FIG. 7(b). As shown in FIG. 7(b), the user first touches the target object with the finger and moves the object with an ordinary drag without separating the finger from the surface (first layer) of the 3-D touch panel 21 (section 71). Next, in the case where the finger approaches a second layer, and the user wants to move the object to the approaching layer, the user separates the finger from the surface of the 3-D touch panel 21 and performs a proximity drag (section 72). The user touches the surface of the 3-D touch panel 21 on the second layer with the finger again to return to the ordinary drag, and thus, the object may be moved on the second layer (section 73).

Referring back to FIG. 4, as described above, if the CPU 11 of the information processing apparatus 1 determines that a predetermined time has passed (step S405: YES), the CPU 11 returns the finger to the position where the object is displayed at the point where the finger has moved to the proximity state and displays the object (step S406).

Figure 8:
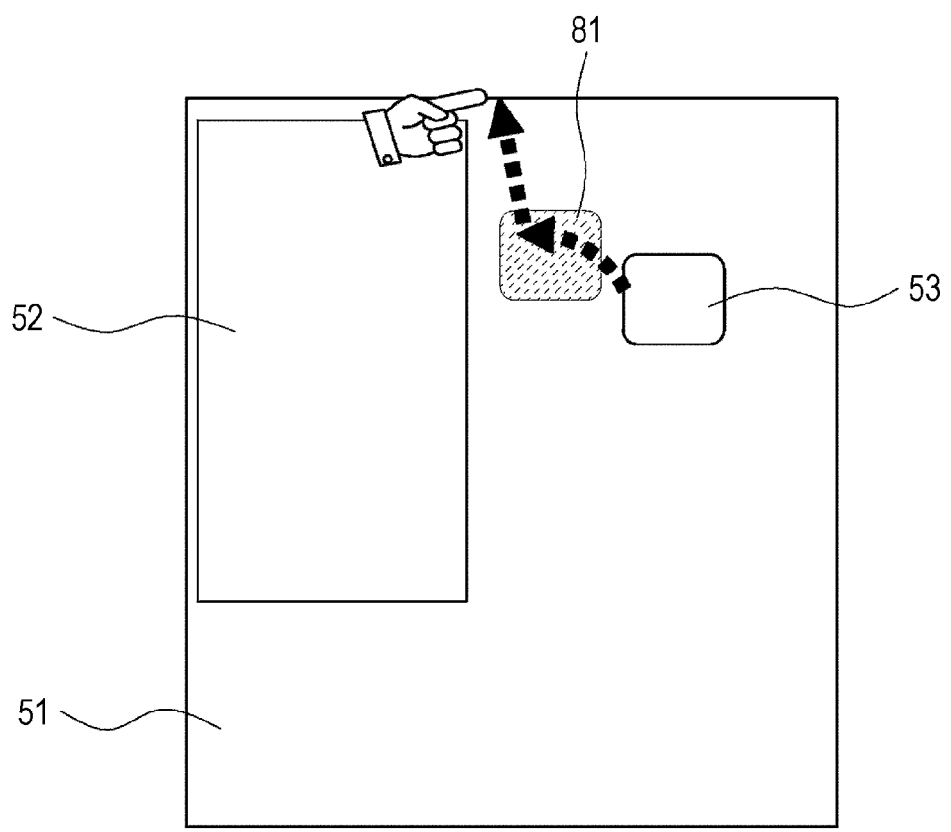
FIG. 8 is a schematic diagram showing the movement of an object when a proximity drag on the 3-D touch panel is cancelled according to the first example implementation of the present subject matter.

FIG. 8 is a schematic diagram showing the movement of the object when the proximity drag on the 3-D touch panel 21 is cancelled according to the first example implementation of the present subject matter. First, the object 53 is moved on the back layer 51 by an ordinary drag, and at the point where the object 53 has moved to a position 81, a proximity drag is started. In this case, if the finger has not moved from the proximity state to the contact state during a predetermined time, that is, if the finger has not returned from the proximity drag to the ordinary drag, the CPU 11 determines that the drag is not the proximity drag and returns the object 53 to the position 81 where it is determined that the finger has moved to the proximity state and displays the object 53.

As described above, the first example implementation allows a desired object to be moved so as to be displayed on a desired layer without interrupting a series of operations by combining a proximity drag with one or more ordinary drags.

Figure 9:
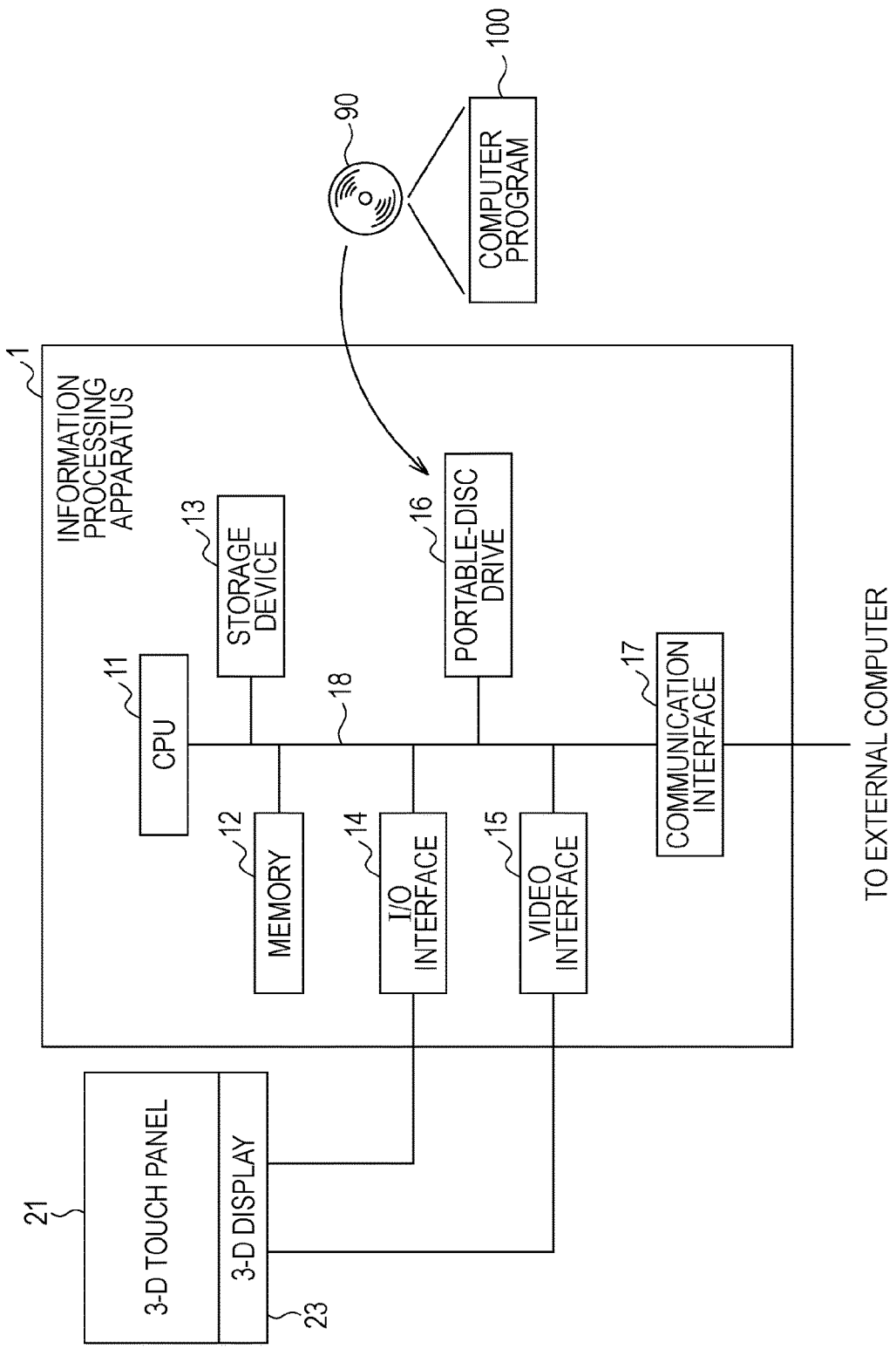
FIG. 9 is a block diagram showing the configuration of an information processing apparatus according to a second example implementation of the present subject matter.

FIG. 9 is a block diagram showing the configuration of an information processing apparatus 1 according to a second example implementation of the present subject matter. Since the configuration of the information processing apparatus 1 according to the second example implementation is the same as that of the first example implementation, detailed description thereof will be omitted by giving the same reference designators. The second example implementation differs from the first example implementation in that an object is moved on a display screen with a feeling of depth by a drag operation by using a 3-D display.

The I/O interface 14 is connected to the 3-D touch panel 21 and accepts data entry as in the first example. On the other hand, unlike the first example, the video interface 15 is connected to a 3-D display 23 integrated with the 3-D touch panel 21 and displays a 3-D image with a feeling of depth. The user operates an object displayed on the 3-D display 23 with a finger.

The operation of the information processing apparatus 1 connected to the 3-D touch panel 21 with the above configuration capable of data communication for moving a displayed object will be described hereinbelow. Although the functional block diagram of the information processing apparatus 1 according to the second example implementation is the same as that of the first example, the functions of the contact-state detection section 101 and the object display section 102 differ.

Specifically, the contact-state detection section 101 of the information processing apparatus 1 receives an output signal from the 3-D touch panel 21 and extracts positional information of a displayed object, depth information, and information on the contact state of the finger in response to the output signal. The depth information is information on the depthwise position of an object displayed on the 3-D display 23, and the information on the contact state of the finger includes information of whether a double-click operation has been performed, in addition to information of whether the finger is in a contact state, a proximity state, or a separate state, for example.

The object display section 102 changes a method for displaying an object, depending on the information on the contact state of the finger. For example, in the case where a double-click operation is detected, the object display section 102 moves a first object to the surface of the display screen of the 3-D display 23 and displays it in whichever position in the depthwise direction the first object is displayed. In the case where it is detected that the finger has moved from the contact state to a proximity state with respect to the first object displayed on the surface of the display screen of the 3-D display 23, the object display section 102 moves the display position of the first object to a position at which a second object is displayed on the nearest side in the depthwise direction of the displayed objects and displays the first object.

In the case where it is detected that the finger has moved from the proximity state to the contact state again, the object display section 102 changes the display position of the first object onto the surface of the display screen of the 3-D display 23 and displays the first object. At the same time, the object display section 102 changes the depthwise display position of the second object by the amount of depthwise movement of the first object. Thus, with the ordinary drag, the target object may always be displayed on the surface of the display screen of the 3-D display 23, and with the proximity drag, the object may be displayed at the display position of the nearest object in the depthwise direction. This may thus reduce a visual feeling of difference between the actual sense of operation with the finger and the depthwise position of an object displayed on the display screen.

Figure 10:
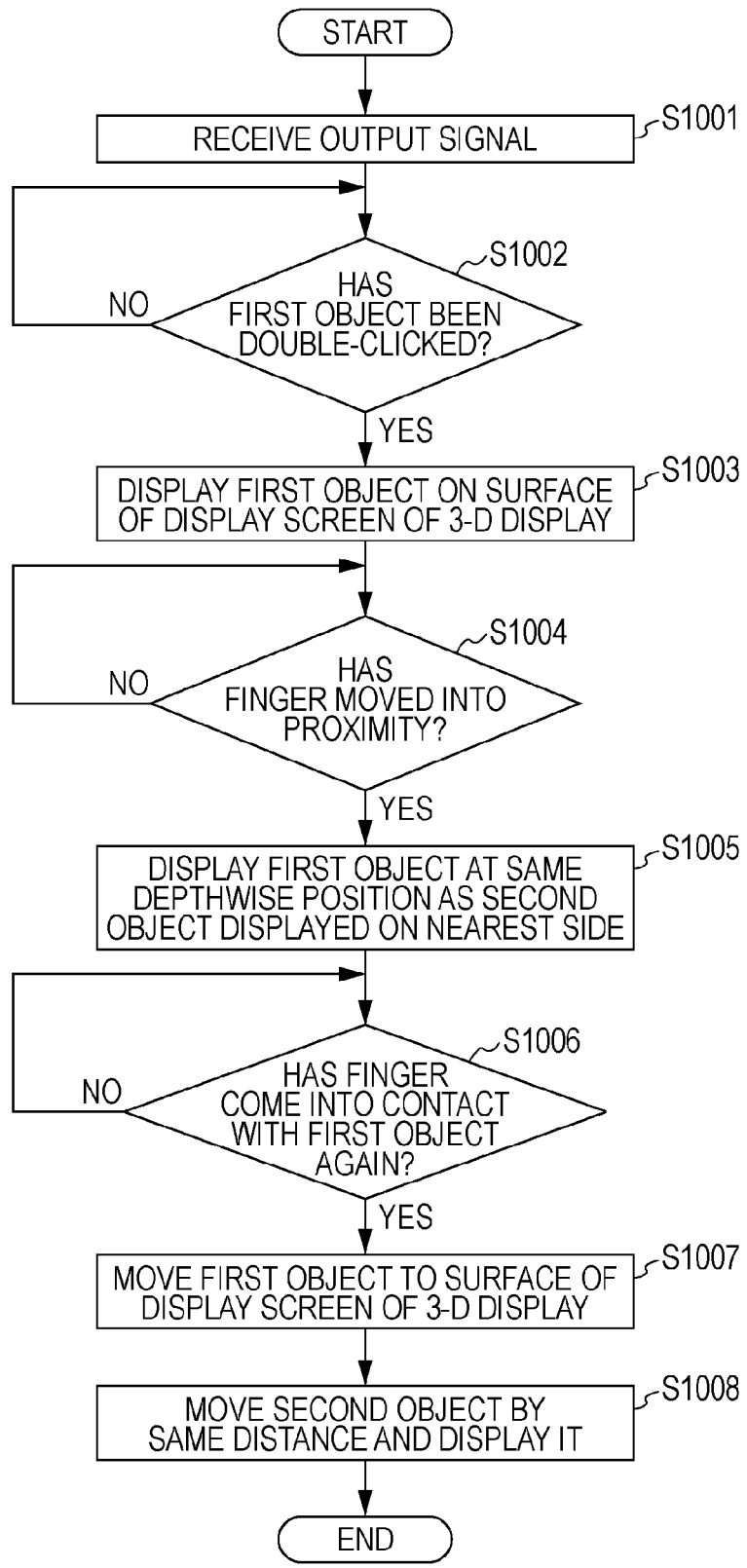
FIG. 10 is a flowchart showing the procedure of the CPU of the information processing apparatus according to the second example implementation of the present subject matter.

FIG. 10 is a flowchart showing the procedure of the CPU 11 of the information processing apparatus 1 according to the second example implementation of the present subject matter. In FIG. 10, the 3-D touch panel 21 is provided with the 3-D display 23, in which a feeling of depth is provided. The object is moved while the feeling of visual difference between the depthwise position of the displayed object and the feeling of actual finger operation is reduced.

Figure 11:
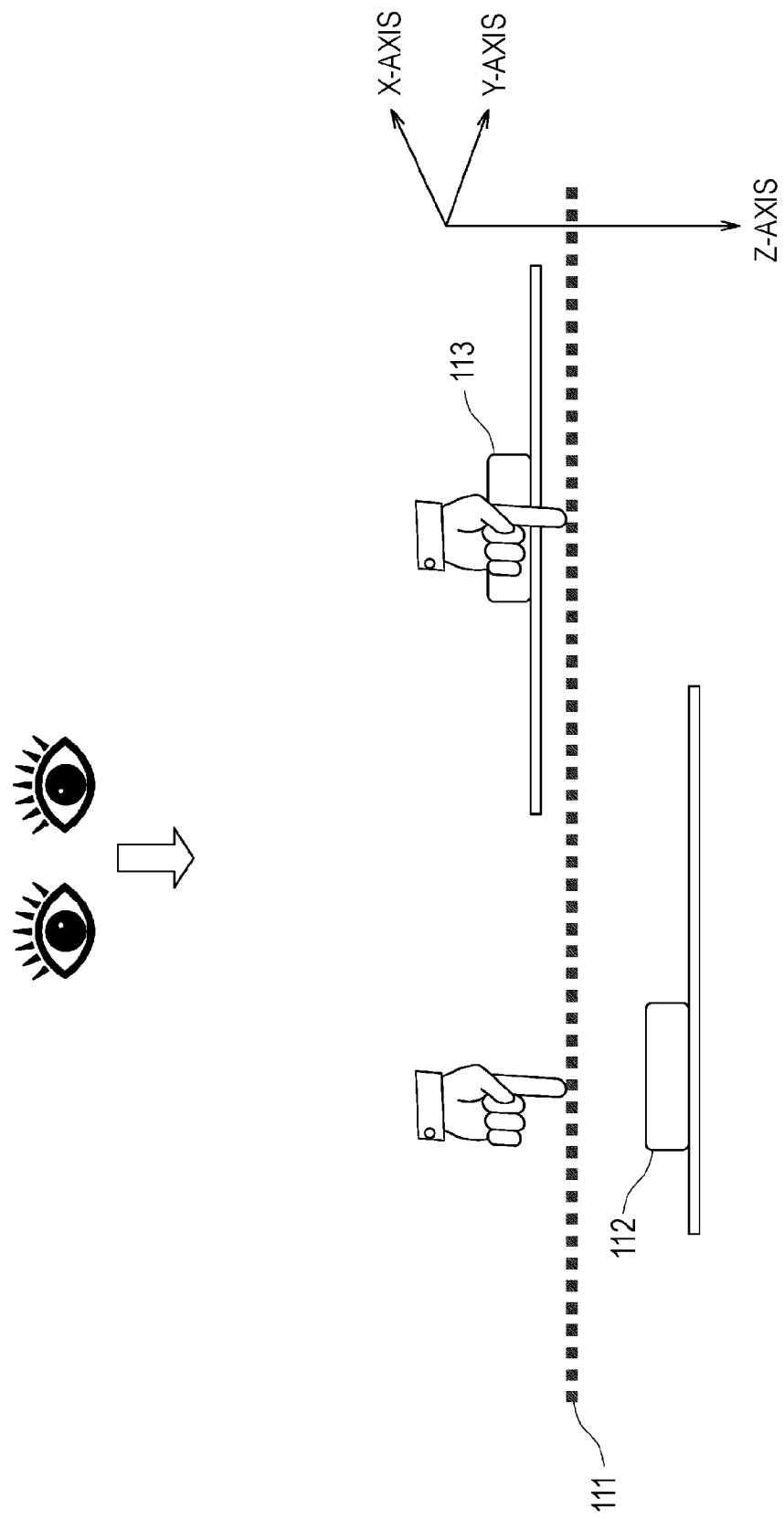
FIG. 11 is a schematic diagram showing the display state of a 3-D touch panel according to the second example implementation of the present subject matter.

FIG. 11 is a schematic diagram showing the display state of the 3-D touch panel 21 according to the second example implementation of the present subject matter. As shown in FIG. 11, assuming that the depthwise direction of the 3-D touch panel 21 is the Z-axis direction, the finger is always on a surface 111 of the display screen of the 3-D display 23, while displayed objects 112 and 113 differ in position in the Z-axis direction. Accordingly, for example, the object 112 may be operated without a touch with the finger, while the object 113 cannot be operated unless the finger goes therethrough.

Thus, the second example implementation is configured such that a target object is moved to the surface 111 of the display screen of the 3-D display 23 by detecting a double-click operation with a finger. This allows the user to operate a target object while visually checking which object is to be operated.

Referring back to FIG. 10, the CPU 11 of the information processing apparatus 1 receives an output signal from the 3-D touch panel 21 (step S1001) and determines whether the displayed first object has been double-clicked with a finger (step S1002).

In the case where the CPU 11 determines that no double-click operation has been performed (step S1002: NO), the CPU 11 goes into a double-click operation waiting state. If the CPU 11 determines that a double-click operation has been performed (step S1002: YES), the CPU 11 determines that the finger is in an ordinary drag operation and moves the first object to the surface of the display screen of the 3-D display 23 and displays it (step S1003).

Figure 12:
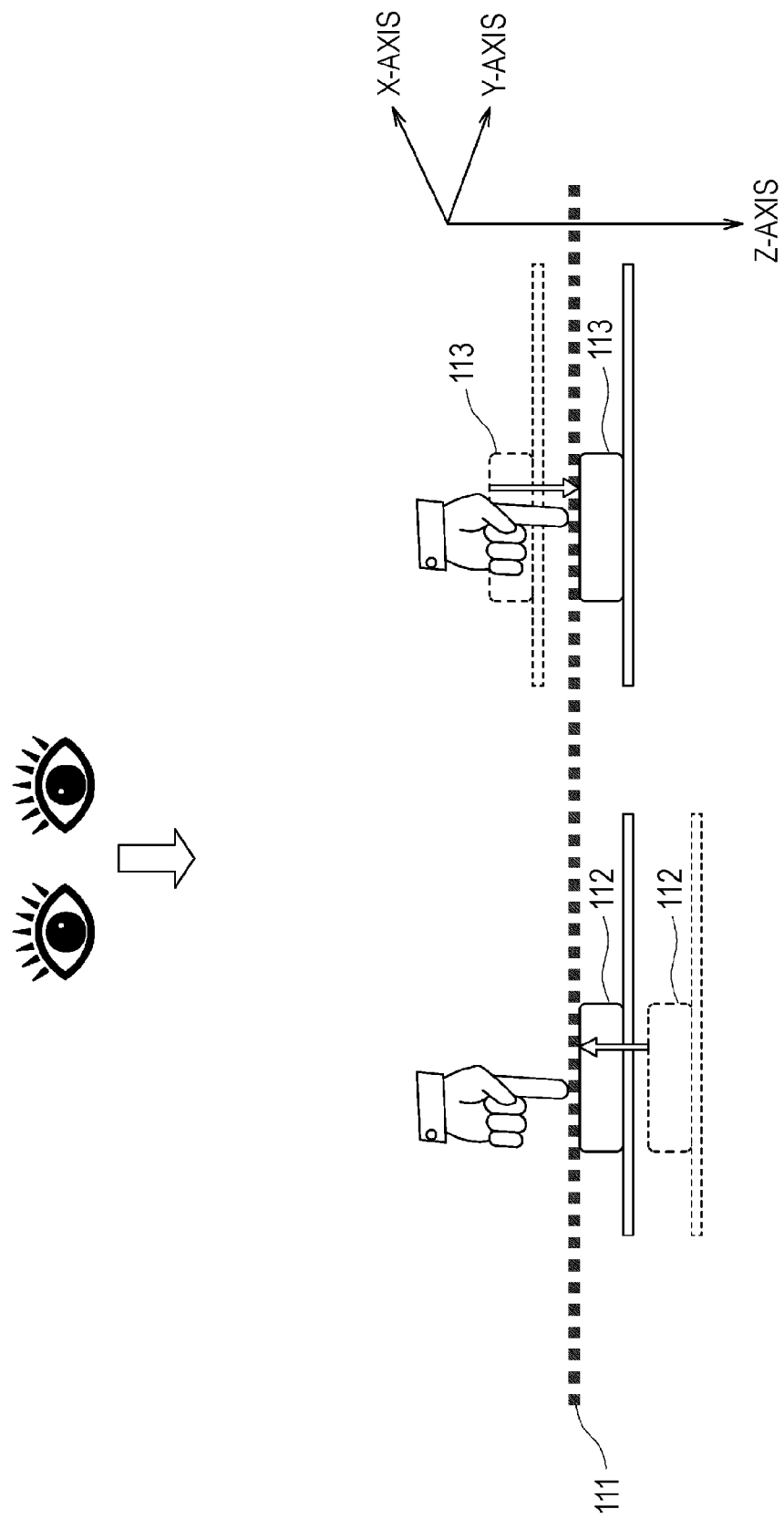
FIG. 12 is a schematic diagram showing an operation example of the 3-D touch panel 21 according to the second example implementation of the present subject matter.

FIG. 12 is a schematic diagram showing an operation example of the 3-D touch panel 21 according to the second example of the present subject matter. As shown in FIG. 12, assuming that the depthwise direction of the 3-D touch panel 21 is the Z-axis direction, the object 112, which may be operated without a touch of a finger in FIG. 11, is moved to the surface 111 of the display screen of the 3-D display 23 by double-clicking thereon, so that the object 112 may be operated with the finger with a feeling of direct operation.

Likewise, the object 113, which cannot be operated unless the finger passes therethrough, is moved to the surface 111 of the display screen of the 3-D display 23 by double-clicking thereon, so that the object 113 may be operated with the finger with a feeling of direct operation.

Referring back to FIG. 10, the CPU 11 of the information processing apparatus 1 determines that the finger is in contact with the displayed first object and determines whether the finger has moved to a proximity state (step S1004). If the CPU 11 determines that the finger has not moved to a proximity state (step S1004: NO), the CPU 11 goes into a proximity-state waiting state. If the CPU 11 determines that the finger has moved to the proximity state (step S1004: YES), the CPU 11 determines that a proximity drag has been started, displays the first object to be subjected to the proximity drag at the same depthwise position, that is, the same Z-axis direction, as that of the nearest side second object (step S1005), and determines whether the finger has moved to the contact state again (step S1006). If the CPU 11 determines that the finger has not moved again (step S1006: NO), the CPU 11 goes into a movement waiting state again.

If the CPU 11 determines that the finger has moved again (step S1006: YES), the CPU 11 determines that the finger has returned to the ordinary drag and moves the first object to the surface of the display screen of the 3-D display 23 and displays it (step S1007). The CPU 11 also moves the second object by the same amount of distance as in step S1007 and displays it (step S1008).

Figure 13:
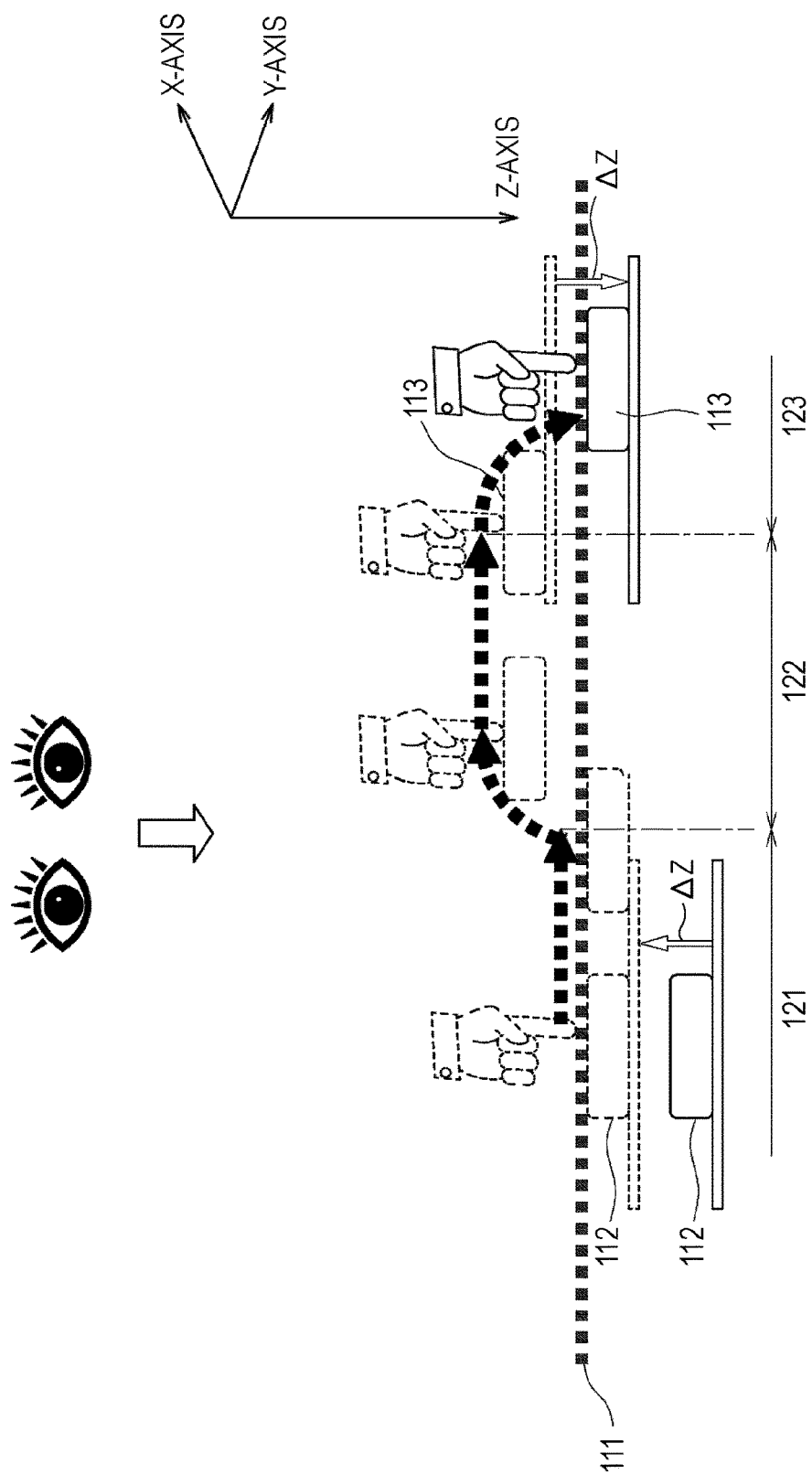
FIG. 13 is an image diagram of object movement by a drag operation on the 3-D touch panel according to the second example implementation of the present subject matter.

FIG. 13 is an image diagram of object movement by a drag operation on the 3-D touch panel 21 according to the second example implementation of the present subject matter. First, in a section 121, an ordinary drag is performed so that the object 112 is moved at a position deeper than the surface 111 of the display screen of the 3-D display 23. The ordinary drag is performed after the object 112 is moved to the surface 111 of the display screen of the 3-D display 23 by a double-clicking operation and is displayed.

Subsequently, in a section 122, a proximity drag is performed. By the proximity drag, the object 112 is displayed at the same depthwise position, that is, the same Z-axis direction position, as that of the object 113 displayed at the nearest side. Accordingly, this may provide the user with a feeling of operation that the object 112 is raised to the near side as the user separates (raises) the finger to the near side. When the finger returns to the ordinary drag in a section 123, in other words, the user brings the finger into contact with the surface 111 of the display screen of the 3-D display 23 again, the object 112 is moved from the depthwise position as that of the nearest side object 113 to the surface 111 of the display screen of the 3-D display 23 and is displayed.

At that time, the second object 113 other than the object 112 is moved by the amount of delta-Z (ΔZ) of movement from the depthwise position of the nearest side object 113 to the surface 111 of the 3-D display 23. This may prevent generation of difference in the feeling of distance in the depthwise direction due to object movement by the operation.

As described above, the second example implementation allows a feeling of operation on a desired object and a feeling of actual finger operation to be naturally linked without interrupting a series of operations by combining a double-click operation and a proximity drag.

Figure 14:
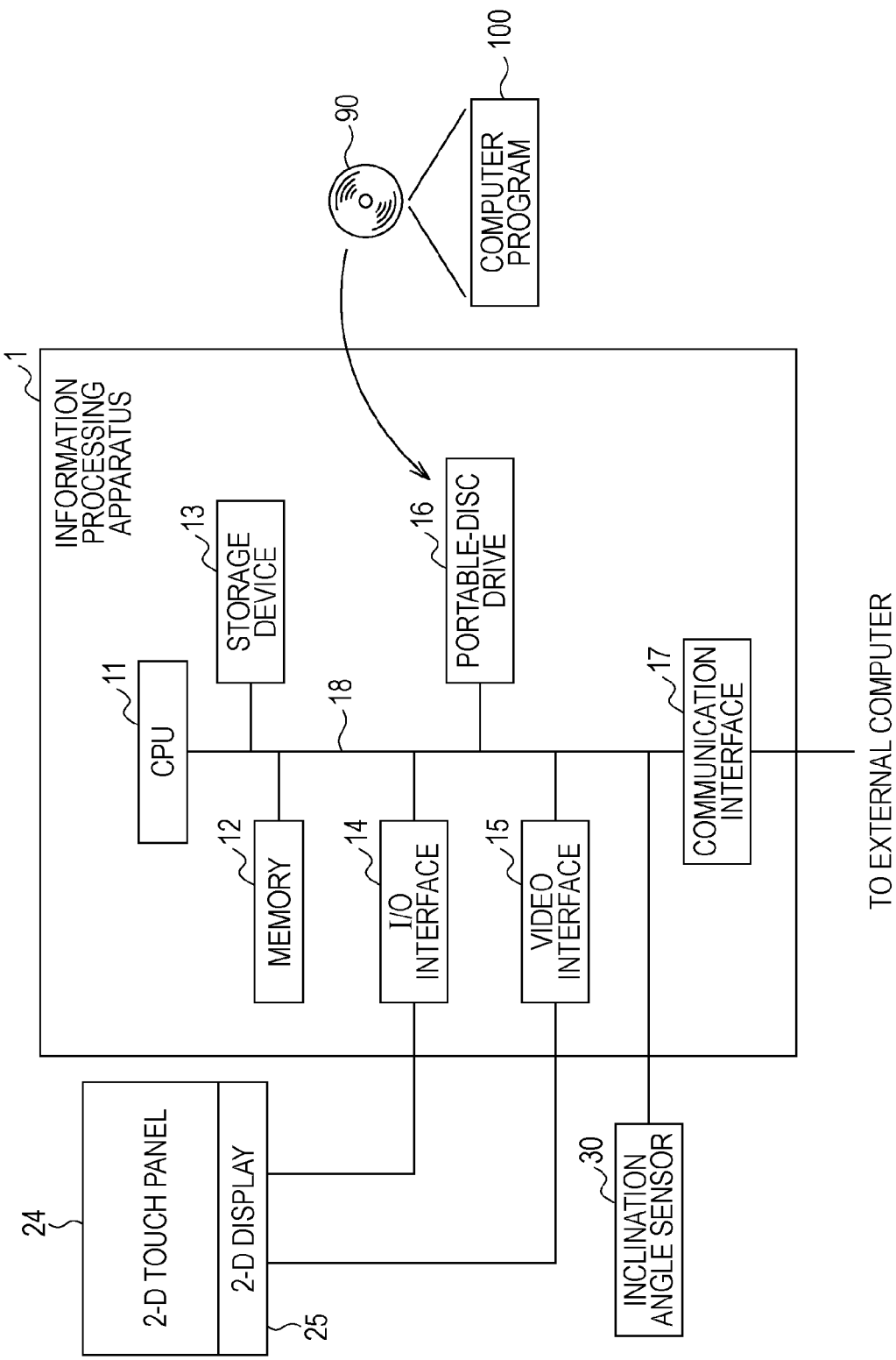
FIG. 14 is a block diagram showing the configuration of an information processing apparatus according to a third example implementation of the present subject matter.

FIG. 14 is a block diagram showing the configuration of an information processing apparatus 1 according to a third example implementation of the present subject matter. Since the configuration of the information processing apparatus 1 is the same as that of the first example, detailed description thereof will be omitted by giving the same reference designators. The third example implementation differs from the first and second examples in that a 2-D display and an inclination angle sensor are used so that a desired object is moved by a drag operation to be displayed on a desired layer without interrupting a series of operations.

In FIG. 14, the I/O interface 14 is connected to a 2-D touch panel 24 and accepts data entry. Unlike the first example, the video interface 15 is connected to a 2-D display 25 integrated with the 2-D touch panel 24 and displays a given image. The user operates an object displayed on the 2-D display 25 with a finger.

Furthermore, an inclination angle sensor 30 is connected to the internal bus 18, so that the angle of inclination of the 2-D touch panel 24 during a drag operation may be detected. An object subjected to a drag operation may be moved and displayed onto a desired layer in accordance with the detected angle of inclination.

The inclination angle sensor 30 is a kind of acceleration sensor and is an inertia sensor for measuring acceleration. In the third example implementation, a capacitance acceleration sensor is used. It is understood that a sensor using another detection principle may be used.

Figure 15:
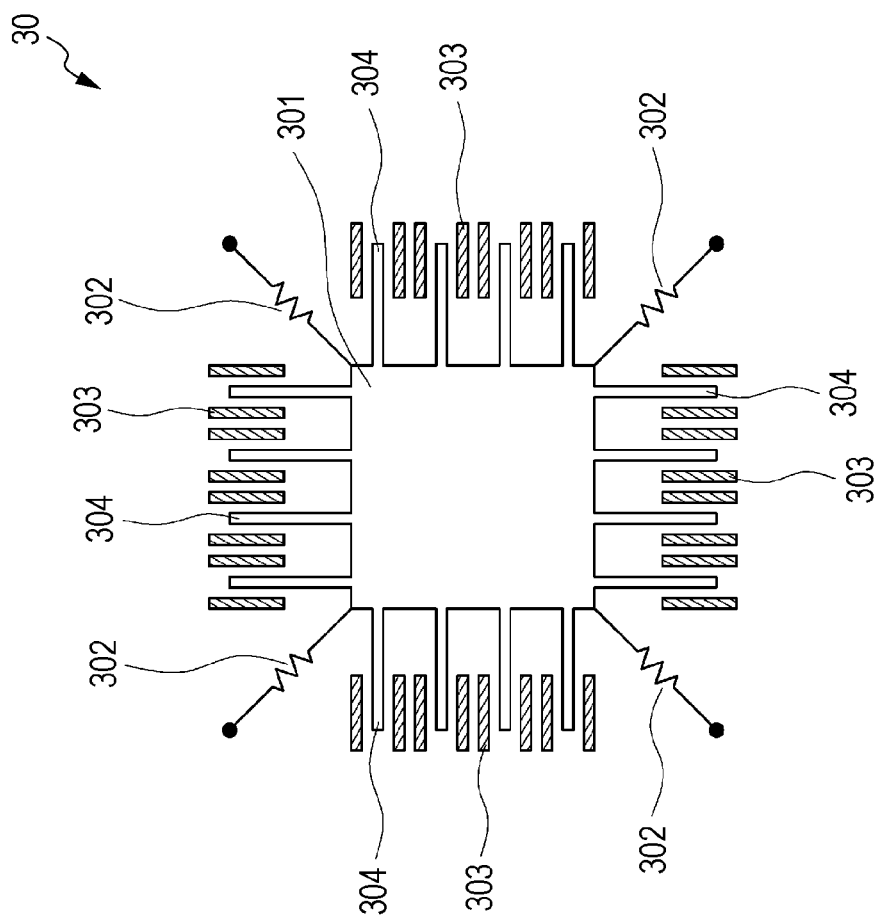
FIG. 15 is a schematic diagram showing, in outline, a configuration of an inclination angle sensor of the information processing apparatus according to the third example implementation of the present subject matter.

FIG. 15 is a schematic diagram showing, in outline, a configuration of the inclination angle sensor 30 of the information processing apparatus 1 according to the third example implementation of the present subject matter. As shown in FIG. 15, the inclination angle sensor 30 includes a moving element 301, four springs 302 that limit the movement of the moving element 301, comb-like movable electrodes 304 for causing changes in electrostatic capacitance depending on the movement (moving distance) of the moving element 301, and fixed electrodes 303. The unit cells of the electrodes are formed such that one movable electrode 304 is sandwiched between two fixed electrodes 303.

In the case where opposite-phase clock signals are applied to two fixed electrodes 303 of a unit cell and when the movable electrode 304 comes close to either of the fixed electrodes 303 due to acceleration, a change in electric charge, with the same phase as that of a clock signal applied to the approached fixed electrode 303, occurs in the movable electrode 304. By amplifying the change in electric charge to perform synchronous detection and rectification, voltage output proportional to the moving distance of the moving element 301, that is, the acceleration, is obtained. In the third example implementation, gravity is measured as the acceleration to calculate the inclination of the inclination angle sensor 30.

The operation of the apparatus connected to the 2-D touch panel 24 with the above configuration capable of data communication for moving a displayed object among a plurality of layers will be described hereinbelow.

Figure 16:
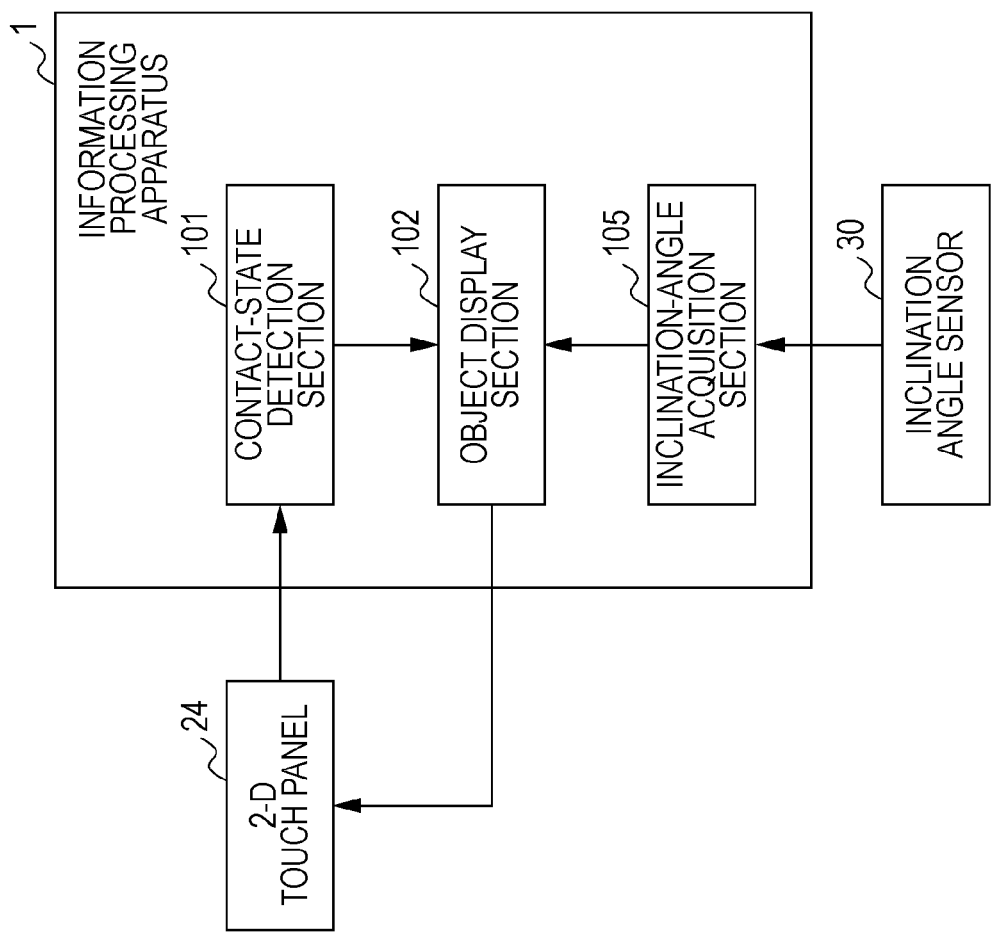
FIG. 16 is a functional block diagram of the information processing apparatus 1 according to the third example implementation of the present subject matter.

FIG. 16 is a functional block diagram of the information processing apparatus 1 according to the third example of the present subject matter. In FIG. 16, the contact-state detection section 101 of the information processing apparatus 1 receives an output signal from the 2-D touch panel 24 and extracts positional information of a displayed object, layer information, and information on the contact state of the finger in response to the output signal. The information on the contact state of the finger is information of whether, for example, the finger is in a contact state, a proximity state, or a separate state, which may be determined from output signals from individual sensors of the 2-D touch panel 24.

The inclination-angle acquisition section 105 receives an output signal from the inclination angle sensor 30 to obtain the angle of inclination.

The inclination angle sensor 30 detects an angle of inclination with respect to an angle of inclination, configured as zero degrees, at the point where the finger touches the 2-D touch panel 24 (at the point where the finger comes into contact with one object) to determine whether the angle is positive or negative. This allows a desired object to be moved onto a desired layer and to be displayed thereon even if the 2-D touch panel 24 is inclined from the beginning.

The object display section 102 changes a method for displaying an object, depending on the information on the contact state of the finger and the angle of inclination. For example, in the case where the finger is in contact with an object displayed on a first layer, if a positive angle of inclination is obtained, the object display section 102 moves the object onto a second layer displayed nearer than the first layer and displays it when the object reaches a position where the second layer is displayed.

In contrast, in the case where the finger is in a contact state with respect to the object displayed on the first layer, if a negative angle of inclination is obtained, the object display section 102 moves the object onto a third layer displayed deeper than the first layer and displays it when the object reaches the third layer.

Figure 17:
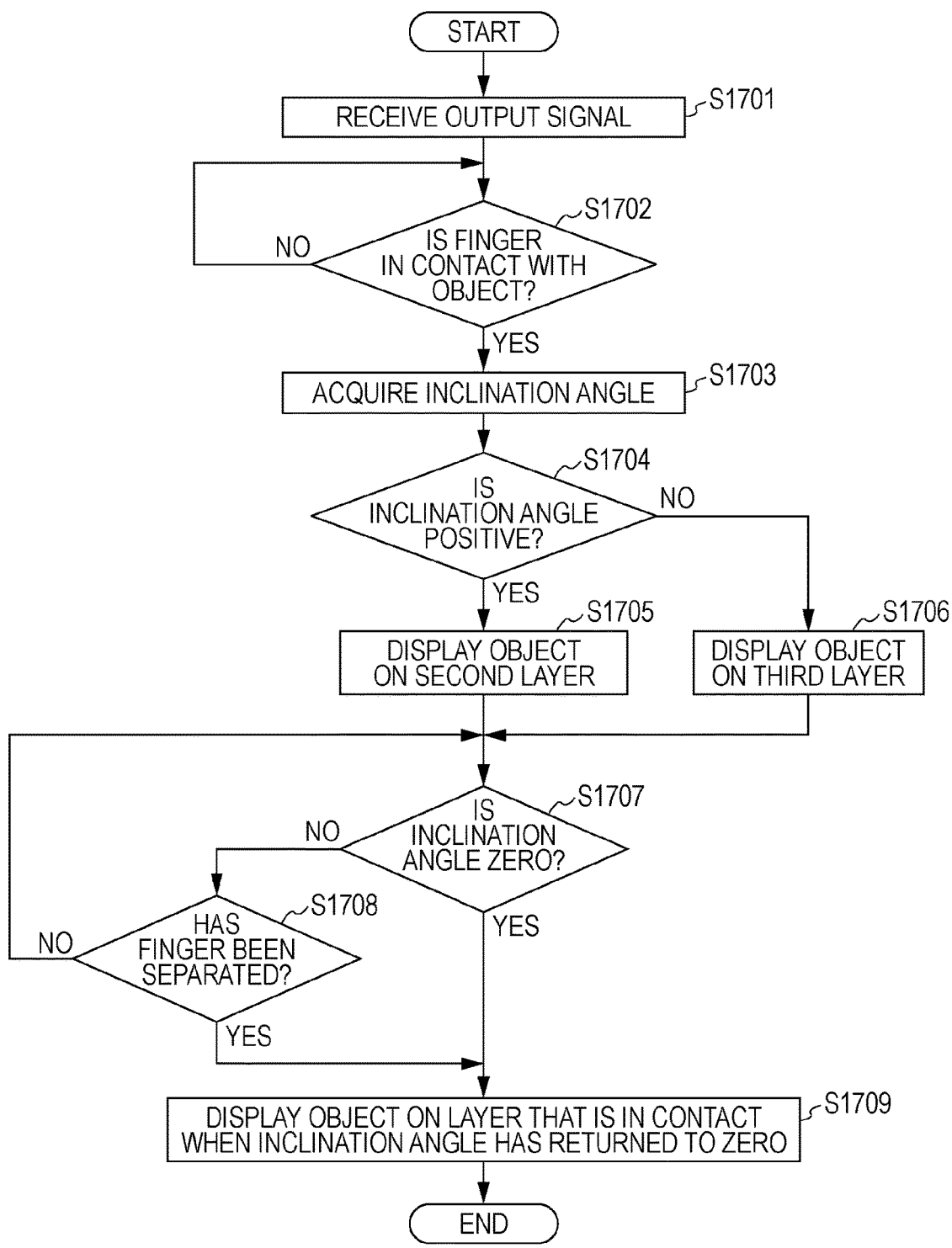
FIG. 17 is a flowchart showing the procedure of the CPU of the information processing apparatus according to the third example implementation of the present subject matter.

FIG. 17 is a flowchart showing the procedure of the CPU 11 of the information processing apparatus 1 according to the third example implementation of the present subject matter. In FIG. 17, the 2-D touch panel 24 is provided with the 2-D display 25, and an object is moved between at least two layers, that is, a front layer displayed at the front side and a back layer.

As shown in FIG. 17, the CPU 11 of the information processing apparatus 1 receives an output signal from the 2-D touch panel 24 (step S1701) and determines whether the finger is in contact with an object displayed on the first layer on the basis of the received output signal (step S1702). If the CPU 11 determines that the finger is not in the contact state (step S1702: NO), the CPU 11 goes into a waiting state until the finger comes into the contact state.

If the CPU 11 determines that the finger is in the contact state (step S1702: YES), the CPU 11 determines that an ordinary drag is started and obtains an angle of inclination from the inclination angle sensor 30 (step S1703). The CPU 11 determines whether the acquired angle of inclination is positive (step S1704), in which case if it is determined that the angle of inclination is positive (step S1704: YES), the CPU 11 displays the object on a second layer displayed nearer than the first layer when the object has reached a position at which the second layer is displayed (step S1705).

If the CPU 11 determines that the angle of inclination is not positive (step S1704: NO), the CPU 11 displays the object on a third layer displayed deeper than the first layer when the finger has reached a position at which the third layer is displayed (step S1706). The CPU 11 then determines whether the angle of inclination has returned to zero (0) (step S1707).

If the CPU 11 determines that the angle of inclination has not returned to zero (0) (step S1707: NO), the CPU 11 determines whether the finger has separated from the surface of the 2-D touch panel 24 (step S1708). If the CPU 11 determines that the finger has not separated (step S1708: NO), the CPU 11 returns the process to step S1707 and repeats the above processes. If the CPU 11 determines that the angle of inclination has returned to zero (0) (step S1707: YES), or if CPU 11 determines that the finger has separated (step S1708: YES), the CPU 11 displays the object on a layer that is in contact at the point where the CPU 11 determines that angle of inclination has returned to zero (0) again (step S1709).

Figure 18:
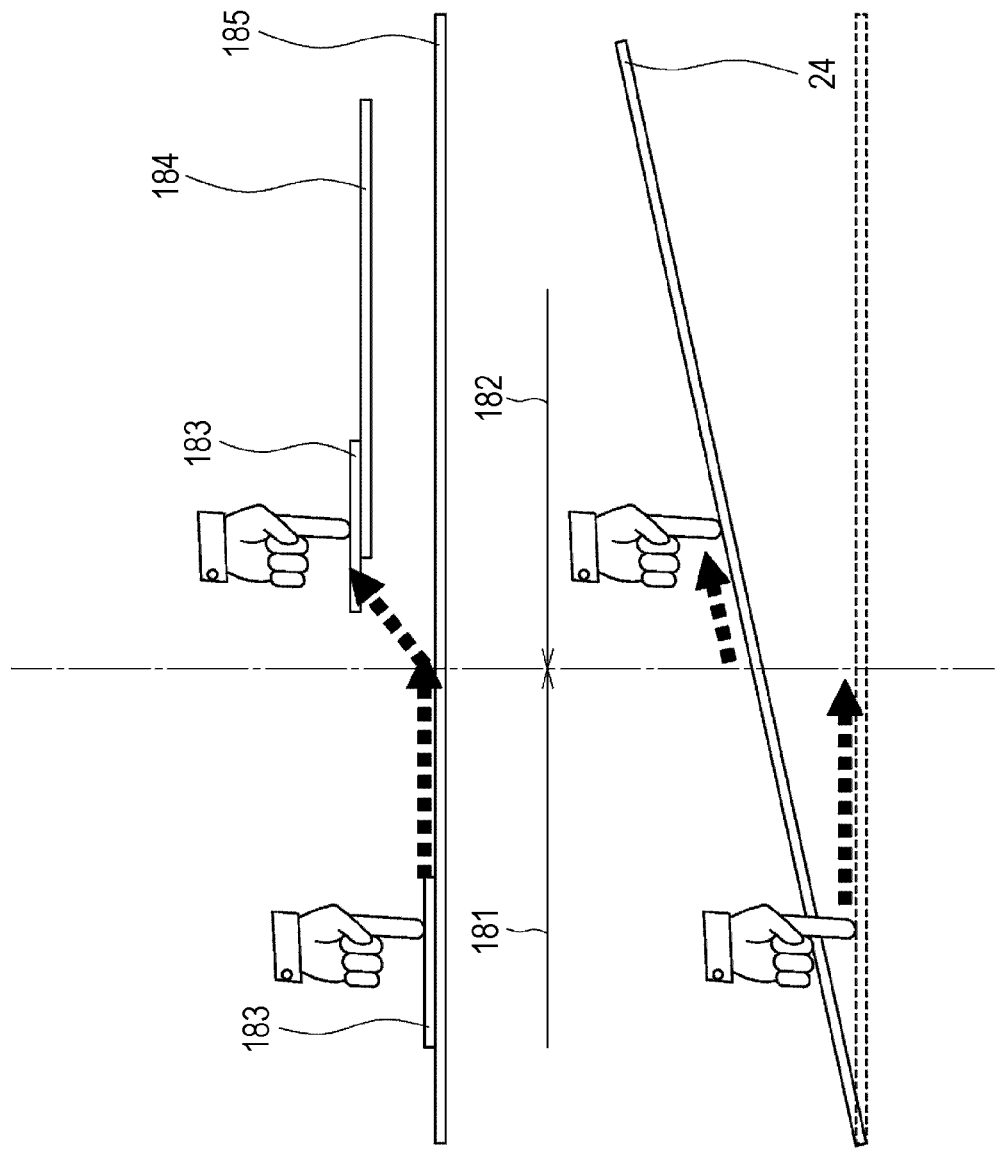
FIG. 18(a) and FIG. 18(b) are schematic diagrams showing the drag operation of a 2-D touch panel according to the third example implementation of the present subject matter.

FIG. 18(a) and FIG. 18(b) are schematic diagrams showing the drag operation of the 2-D touch panel 24 according to the third example implementation of the present subject matter. FIG. 18(a) is an image diagram of object movement by a drag operation on the 2-D touch panel 24, and FIG. 18(b) is an image diagram of an actual drag operation on the 2-D touch panel 24.

As shown in FIG. 18(a), an ordinary drag is first performed in a section 181 to move an object 183 on a lower layer (first layer) 185. Subsequently, an ordinary drag is performed in a section 182, with the 2-D touch panel 24 itself inclined. When the finger comes near (reaches) an upper layer (second layer) 184, the object 183 moves onto the upper layer (second layer) 184 because the angle of inclination is positive. If the angle of inclination is negative, the object 183 moves onto a third layer (not shown) deeper than the lower layer 185 when the finger comes near the third layer.

The actual movement of the user's finger is shown in FIG. 18(b). As shown in FIG. 18(b), the user first touches the target object with the finger and moves the object with an ordinary drag without separating the finger from the surface of the 2-D touch panel 24 (section 181). Next, in the case where the finger approaches another layer, and the user wants to move the object to the approaching layer, the user performs an ordinary drag while inclining the 2-D touch panel 24 to this side (section 182). Thus, by actually inclining the 2-D touch panel 24, a desired object may be moved onto a desired layer.

In the case where information of whether, for example, the finger is in a contact state, a proximity state, or a separate state, is obtained as an output signal from the 2-D touch panel 24, the distance between the finger and the 2-D touch panel 24 may also be estimated from a change in electrostatic voltage, and thus, the angle of inclination of the motion of the finger may also be estimated. Accordingly, the same advantages may be offered by inclining the motion of the finger and not by inclining the 2-D touch panel 24.

As described above, the third example implementation allows a desired object to be moved to be displayed on a desired layer by detecting the angle of inclination without interrupting a series of operations.

Figure 19:
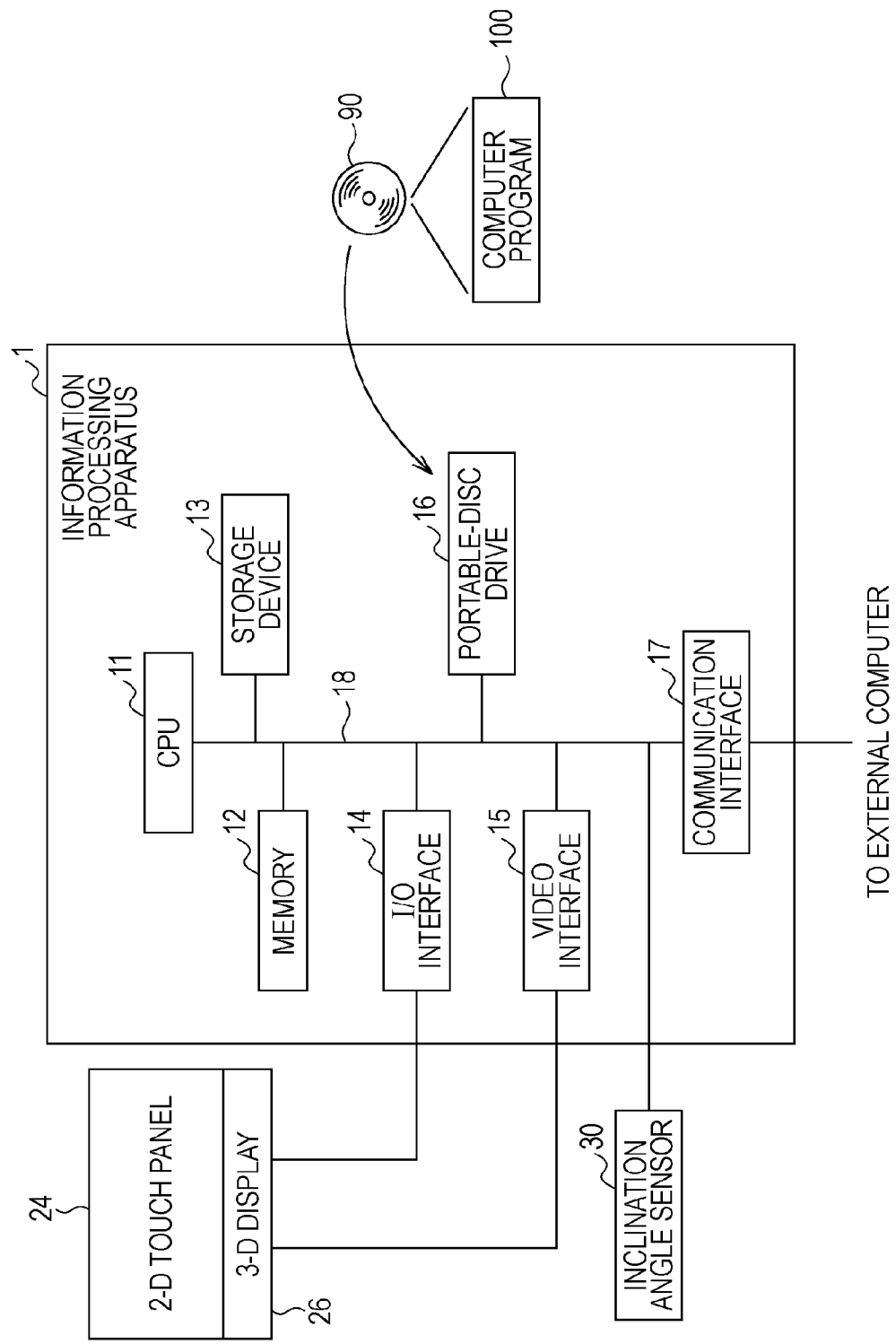
FIG. 19 is a block diagram showing the configuration of an information processing apparatus according to a fourth example implementation of the present subject matter.

FIG. 19 is a block diagram showing the configuration of an information processing apparatus 1 according to a fourth example implementation of the present subject matter. Since the configuration of the information processing apparatus 1 is the same as that of the first example, detailed description thereof will be omitted by giving the same reference designators. The fourth example implementation differs from the first to third examples in that an object is moved at different heights on a display screen with a feeling of depth by a drag operation by using a 3-D display and the inclination angle sensor 30.

In FIG. 19, the I/O interface 14 is connected to the 2-D touch panel 24 and accepts data entry. Unlike the first example, the video interface 15 is connected to a 3-D display 26 integrated with the 2-D touch panel 24 and displays a 3-D image with a feeling of depth. The user operates an object displayed on the 3-D display 26 with a finger.

Furthermore, the inclination angle sensor 30 is connected to the internal bus 18, so that the angle of inclination during a drag operation may be detected. An object subjected to a drag operation may be moved to a desired depthwise position in accordance with the angle of inclination and may be displayed.

The operation of the information processing apparatus 1 connected to the 2-D touch panel 24 with the above configuration capable of data communication for moving a displayed object will be described hereinbelow. Although the functional block diagram of the information processing apparatus 1 according to the fourth example implementation is the same as that of the third example implementation, the functions of the contact-state detection section 101 and the object display section 102 differ.

Specifically, the contact-state detection section 101 of the information processing apparatus 1 receives an output signal from the 2-D touch panel 24 and extracts positional information of a displayed object, depth information, and information on the contact state of the finger in response to the output signal. The depth information is information on the depthwise position of an object displayed on the 3-D display 26, and the information on the contact state of the finger includes information on whether a double-click operation has been performed, in addition to the information of whether, for example, the finger is in a contact state, a proximity state, or a separate state.

The inclination-angle acquisition section 105 receives an output signal from the inclination angle sensor 30 to obtain the angle of inclination.

The inclination angle sensor 30 detects an angle of inclination, with respect to an angle of inclination configured as zero degrees, at the point where the finger comes into contact with the 2-D touch panel 24 to determine whether the angle is positive or negative. This allows a target object to be moved to a desired depthwise position and be displayed thereon even if the 2-D touch panel 24 is inclined from the beginning.

The object display section 102 changes a method for displaying the object, depending on the information on the contact state of the finger and the angle of inclination. For example, in the case where a double click operation is detected, the target object is moved to the surface of the display screen of the 3-D display 26 at whichever depthwise position the target object is displayed. For example, in the case where the finger is in contact with an object displayed on a first layer, if a positive angle of inclination is obtained, the object is inclined at an angle opposite in positive and negative to the obtained angle of inclination. Accordingly, even if the 2-D touch panel 24 is inclined, the object displayed on the 3-D display 26 does not differ from the initial display state for the user.

Figure 20:
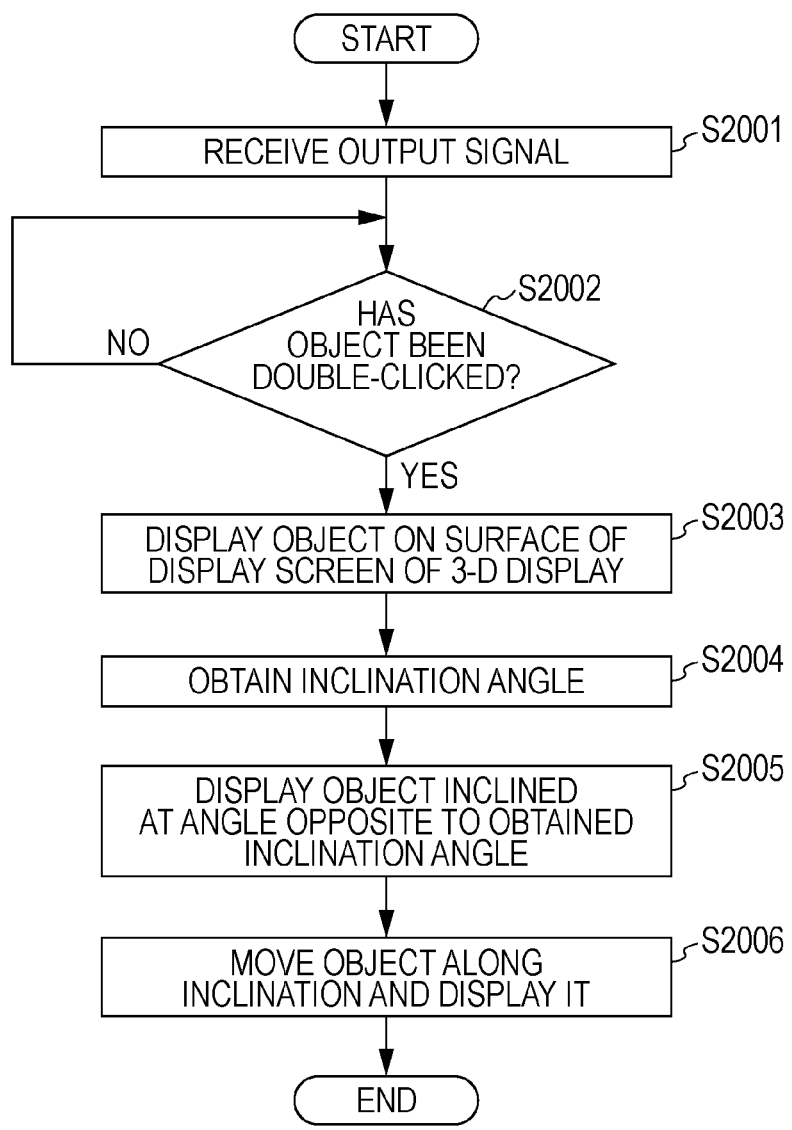
FIG. 20 is a flowchart showing the procedure of the CPU of the information processing apparatus according to the fourth example implementation of the present subject matter.

FIG. 20 is a flowchart showing the procedure of the CPU 11 of the information processing apparatus 1 according to the fourth example implementation of the present subject matter. In FIG. 20, the 2-D touch panel 24 is provided with the 3-D display 26. A displayed object is moved while a visual feeling of difference between the depthwise position of the object and the actual sense of operation with the finger is reduced.

As shown in FIG. 20, the CPU 11 of the information processing apparatus 1 receives an output signal from the 2-D touch panel 24 (step S2001) and determines whether a double-click operation with a finger has been performed on the displayed object on the basis of the received output signal (step S2002). If the CPU 11 determines that no double-click operation has been performed (step S2002: NO), the CPU 11 goes into an operation waiting state.

If the CPU 11 determines that a double-click operation has been performed (step S2002: YES), the CPU 11 determines to perform an ordinary drag and moves the object to the surface of the display screen of the 3-D display 26 and displays it (step S2003).

FIG. 21 is a schematic diagram showing an operation example of the 2-D touch panel 24 according to the fourth example implementation of the present subject matter. As shown in FIG. 21, assuming that the depthwise direction of the 2-D touch panel 24 is the Z-axis direction, the object 112, which may be operated without a touch of a finger in FIG. 11, is moved to the surface 111 of the display screen of the 3-D display 26 by double-clicking thereon, so that the object 112 may be operated with the finger with a feeling of direct operation.

Referring back to FIG. 20, the CPU 11 of the information processing apparatus 1 determines that a ordinary drag is started and obtains an angle of inclination from the inclination angle sensor 30 (step S2004). The CPU 11 displays the object inclined at an angle opposite in positive and negative to the obtained angle of inclination (step S2005) and continues the ordinary drag. The CPU 11 moves the object along the obtained inclination and displays it (step S2006).

FIG. 22(*a*) and FIG. 22(*b*), and FIG. 23(*a*) and FIG. 23(*b*), are schematic diagrams showing examples of object movement on the 2-D touch panel 24 according to the fourth example implementation of the present subject matter. When the 2-D touch panel 24 is inclined, the surface 111 of the display screen of the 3-D display 26 is also inclined. If the angle of inclination theta is greater than zero (θ>0) (i.e., positive), as shown in FIG. 22(*b*), the object 112 is moved along the surface 111 of the display screen of the 3-D display 26 by an ordinary drag, and when the object 112 reaches a layer nearer than the original layer 221 located on the back, that is, a front layer 222, as shown in FIG. 22(*a*), the object 112 is displayed as moved onto the front layer 222. If the angle of inclination theta is less than zero (θ<0) (i.e., negative), as shown in FIG. 23(*b*), the object 112 is moved along the surface 111 of the display screen of the 3-D display 26 by an ordinary drag, and when the object 112 reaches a layer deeper than the original layer located on the back, that is, a back layer 223, as shown in FIG. 23(*a*), the object 112 is displayed as moved onto the back layer 223.

Figure 24A:
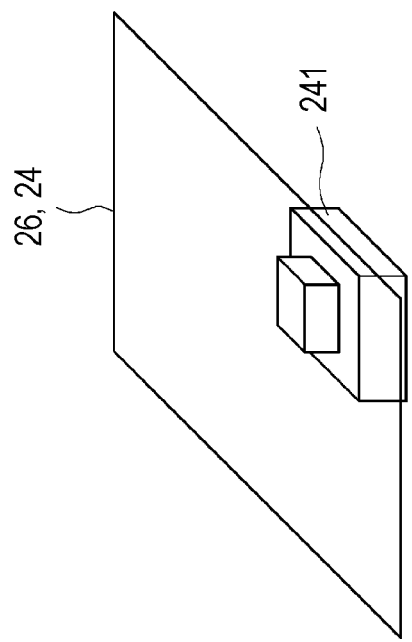
FIG. 24(a), FIG. 24(b), and FIG. 24(c) are schematic diagrams showing an object display example on a 3-D display 26 according to the fourth example implementation of the present subject matter.
Figure 24B:
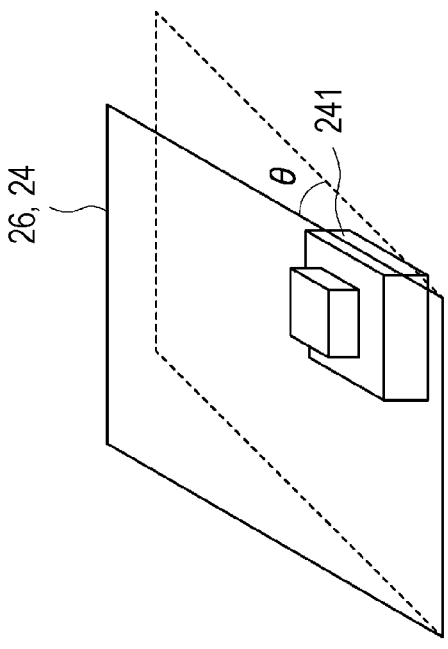
Figure 24C:
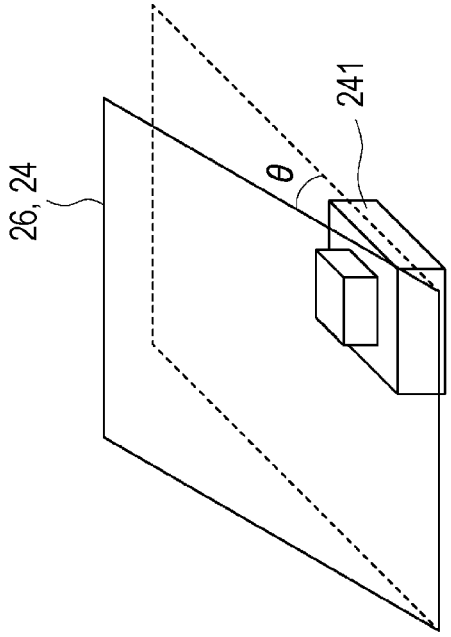

FIG. 24(*a*), FIG. 24(*b*), and FIG. 24(*c*) are schematic diagrams showing an object display example on the 3-D display 26 according to the fourth example implementation of the present subject matter. As shown in FIG. 24(*a*), a 3-D model object 241 is displayed under the 3-D display 26.

When the 3-D display 26 is inclined at the angle theta (θ) in this state, the object 241 may also be generally inclined by the angle theta (θ), as shown in FIG. 24(*b*), so that the positional relationship between the surface of the 3-D display 26 and the object 241 does not change.

However, in the fourth example implementation, when the 3-D display 26 is inclined at the angle theta ($\theta$), relative display coordinates of the object 241 are inclined at an angle negative theta ($-\theta$) opposite in positive and negative from the angle of inclination theta ($\theta$) calculated, so that the object 241 is displayed on the 3-D display 26, as shown in FIG. 24(*c*). Accordingly, even if the 3-D display 26 is inclined at the angle theta ($\theta$), the object 241 may be viewed by the user as if it is displayed in the initial state without inclination.

Accordingly, in the case where the 2-D touch panel 24 is inclined, the object 241 to be dragged on the 3-D display 26 is viewed from the user as if it is moved directly in the heightwise direction of the object 241, thus reducing a visual feeling of difference.

As described above, the fourth example allows a feeling of operation on a desired object and a feeling of actual finger operation to be naturally linked without interrupting a series of operations by combining a double-click operation and the inclination of the touch panel.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is to be understood that the present subject matter is not limited to the foregoing examples and various changes and modifications may be made within the spirit of the present subject matter.

What is claimed is:

1. A method for moving a displayed object among a plurality of displayed layers by an information processing apparatus connected to a three-dimensional (3-D) touch panel capable of data communication therewith, comprising:
   detecting a contact state of a finger with respect to an object displayed on a first displayed layer; and
   in response to detecting that the finger has moved from the contact state to a proximity state with respect to the object and in response to detecting the finger in the proximity state moving over a second displayed layer displayed nearer than the first displayed layer, moving the object onto the second displayed layer.

2. The method according to claim 1, further comprising, in response to detecting that the finger has moved from the proximity state to the contact state with respect to the object again, displaying the object on a displayed layer with which the finger is in contact at a point on a display surface of a display screen where it is detected that the finger has moved to the contact state again.

3. The method according to claim 1, further comprising:
   measuring a time from when the finger moved to the proximity state with respect to the object;
   determining whether a predetermined time has elapsed after a start of the time measurement; and
   in response to determining that the predetermined time has elapsed, returning the object to a position at which the object was displayed at a point on the display surface of the display screen where it was detected that the finger initially moved to the proximity state.

4. An apparatus connected to a three-dimensional (3-D) touch panel capable of data communication therewith for moving a displayed object among a plurality of displayed layers, comprising:
   a processor programmed to:
      detect a contact state of a finger with respect to an object displayed on a first displayed layer; and
      in response to a detection that the finger has moved from the contact state to a proximity state with respect to the object and in response to a detection of the finger in the proximity state moving over a second displayed layer displayed nearer than the first displayed layer, move the object onto the second displayed layer.

5. The apparatus according to claim 4, where the processor is further programmed to, in response to a detection that the finger has moved from the proximity state to the contact state with respect to the object again, display the object on a displayed layer with which the finger is in contact at a point on a display surface of a display screen where it is detected that the finger has moved to the contact state again.

6. The apparatus according to claim 4, where the processor is further programmed to:
   measure a time from when the finger has moved to the proximity state with respect to the object;
   determine whether a predetermined time has elapsed after a start of the time measurement; and
   in response to determining that the predetermined time has elapsed, return the object to a position at which the object was displayed at a point on the display surface of the display screen where it was detected that the finger initially moved to the proximity state.

7. A computer program product comprising a computer readable storage medium comprising computer readable program code, where the computer readable program code when executed on a computer causes the computer to:
   detect a contact state of a finger with respect to an object displayed on a first displayed layer of a plurality of displayed layers; and
   in response to detecting that the finger has moved from the contact state to a proximity state with respect to the object and in response to detecting the finger in the proximity state moving over a second displayed layer displayed nearer than the first displayed layer, move the object onto the second displayed layer.

8. The computer program product of claim 7, where the computer readable program code when executed on the computer further causes the computer to, in response to detecting that the finger has moved from the proximity state to the contact state with respect to the object again, display the object on a displayed layer with which the finger is in contact at a point on a display surface of a display screen where it is detected that the finger has moved to the contact state again.

9. The computer program product of claim 7, where the computer readable program code when executed on the computer further causes the computer to:
    measure a time from when the finger moved to the proximity state with respect to the object;
    determine whether a predetermined time has elapsed after a start of the time measurement; and
    in response to determining that the predetermined time has elapsed, return the object to a position at which the object was displayed at a point on the display surface of the display screen where it was detected that the finger initially moved to the proximity state.

10. The computer program product of claim 7, where the detection that the finger has moved from the contact state to the proximity state with respect to the object in combination with the detection of the finger in the proximity state moving over the second displayed layer displayed nearer than the first displayed layer collectively comprises detection of an inter-layer proximity object drag operation.

11. The method of claim 1, where the detection that the finger has moved from the contact state to the proximity state with respect to the object in combination with the detection of the finger in the proximity state moving over the second displayed layer displayed nearer than the first displayed layer collectively comprises detection of an inter-layer proximity object drag operation.

12. The apparatus according to claim 4, where the detection that the finger has moved from the contact state to the proximity state with respect to the object in combination with the detection of the finger in the proximity state moving over the second displayed layer displayed nearer than the first displayed layer collectively comprises detection of an inter-layer proximity object drag operation.

* * * * *